United States Patent
Fink et al.

(10) Patent No.: US 12,462,711 B2
(45) Date of Patent: Nov. 4, 2025

(54) SYSTEMS, METHODS AND APPARATUS FOR SURGICAL MODELS

(71) Applicant: Apodeixis, LLC, Silver Spring, MD (US)

(72) Inventors: Owen Thompson Fink, Silver Spring, MD (US); Peter John Lotsikas, Myersville, MD (US)

(73) Assignee: Apodeixis, LLC, Silver Spring, MD (US)

( * ) Notice: Subject to any disclaimer, the term of this patent is extended or adjusted under 35 U.S.C. 154(b) by 757 days.

(21) Appl. No.: 17/741,675

(22) Filed: May 11, 2022

(65) Prior Publication Data

US 2022/0270517 A1     Aug. 25, 2022

Related U.S. Application Data

(63) Continuation of application No. PCT/US2020/060022, filed on Nov. 11, 2020.

(60) Provisional application No. 62/934,124, filed on Nov. 12, 2019.

(51) Int. Cl.
    *G09B 23/30*     (2006.01)
    *G09B 23/32*     (2006.01)
    *G09B 23/34*     (2006.01)

(52) U.S. Cl.
    CPC ............. *G09B 23/32* (2013.01); *G09B 23/34* (2013.01)

(58) Field of Classification Search
    CPC ........ G09B 23/28; G09B 23/30; G09B 23/32; G09B 23/34
    USPC ......................................................... 434/274
    See application file for complete search history.

(56) References Cited

U.S. PATENT DOCUMENTS

| | | | |
|---|---|---|---|
| 4,331,428 A | 5/1982 | Chandler | |
| 4,677,973 A | 7/1987 | Slocum | |
| 5,967,790 A | 10/1999 | Strover et al. | |
| 6,361,729 B1 | 3/2002 | Strover et al. | |
| 6,468,087 B2 * | 10/2002 | Slocum .................. | G09B 23/32 623/18.11 |
| 6,695,619 B2 | 2/2004 | Brown-Wilkinson | |
| 6,908,309 B2 | 6/2005 | Gil et al. | |
| 6,942,488 B2 | 9/2005 | Slocum | |
| 7,384,268 B2 * | 6/2008 | Browne-Wilkinson ...... | G09B 23/32 434/274 |
| 7,748,984 B2 * | 7/2010 | McAllister ............. | G09B 23/30 434/274 |
| 7,927,338 B2 | 4/2011 | Laffargue et al. | |
| 8,388,351 B2 * | 3/2013 | Potti Cuervo ......... | G09B 23/32 434/274 |
| 8,425,234 B2 | 4/2013 | Sakezles | |
| 8,977,021 B2 | 3/2015 | Kang et al. | |
| 9,622,802 B2 | 4/2017 | Embleton et al. | |
| 10,076,321 B2 | 9/2018 | Crane et al. | |
| 10,325,523 B2 * | 6/2019 | Wilson ..................... | G09B 9/00 |
| 10,952,753 B2 * | 3/2021 | McAuliffe ........... | A61B 17/157 |

(Continued)

FOREIGN PATENT DOCUMENTS

AU     2008323521 A1     5/2009

*Primary Examiner* — Kurt Fernstrom
(74) *Attorney, Agent, or Firm* — Leveque Intellectual Property Law, P.C.

(57) ABSTRACT

Systems, methods and apparatus for providing three dimensional, transforming demonstration models that illustrate the way different osteotomy surgical procedures change the geometry of the relevant bones from a pre-surgical state to a post-surgical state.

20 Claims, 24 Drawing Sheets

(56) References Cited

U.S. PATENT DOCUMENTS

| | | | |
|---|---|---|---|
| 10,971,037 B2* | 4/2021 | Brady | G09B 23/32 |
| 2005/0014114 A1* | 1/2005 | Slocum | G09B 23/32 |
| | | | 434/267 |
| 2006/0229621 A1 | 10/2006 | Cadmus | |
| 2008/0286736 A1* | 11/2008 | Browne-Wilkinson | G09B 23/32 |
| | | | 623/18.11 |
| 2012/0202180 A1 | 8/2012 | Stock et al. | |
| 2014/0030682 A1 | 1/2014 | Thilenius | |
| 2017/0287364 A1* | 10/2017 | Price | G09B 23/34 |
| 2018/0125550 A1 | 5/2018 | Shenoy et al. | |
| 2018/0235641 A1 | 8/2018 | McAuliffe et al. | |
| 2018/0342180 A1 | 11/2018 | Brady | |
| 2018/0360442 A1 | 12/2018 | Crane et al. | |
| 2019/0269514 A1 | 9/2019 | Sidebotham et al. | |
| 2023/0306876 A1* | 9/2023 | D'Amico | G09B 23/34 |

* cited by examiner

SYSTEMS, METHODS AND APPARATUS FOR SURGICAL MODELS

CROSS-REFERENCE TO RELATED APPLICATIONS

This application is a continuation of international application number PCT/US2020/060022 (filed on Nov. 11, 2020), which claims priority to U.S. Provisional Application Ser. No. 62/934,124 (filed on Nov. 12, 2019), the contents of which are incorporated by reference herein in their entireties.

BACKGROUND

The present disclosure relates generally to demonstration models. More particularly, the present disclosure relates to demonstration models for osteotomy surgical procedures.

Some approaches to demonstrate and provide instruction for surgical procedures use human and/or animal cadavers, such as canine, porcine, or bovine cadaver specimens. While helpful, these cadaver specimens are often very costly and may create biohazard waste issues. Furthermore, the usefulness of cadaver models may be limited. For example, although cadaver tissues provide an accurate representation of anatomical geometry, the required chemical preservation, such as embalming fluid, which may include formaldehyde, methanol, glutaraldehyde, greatly alters the physical properties of the tissues. Therefore, it would be useful to provide an improved approach to surgical procedures that does not rely upon cadavers.

BRIEF DESCRIPTION OF THE DRAWINGS

The accompanying drawings, which are incorporated in and constitute a part of this specification, illustrate embodiments of the present disclosure and, together with a general description given above, and the detailed description given below, serve to explain the principles of the present disclosure.

Figure 1:
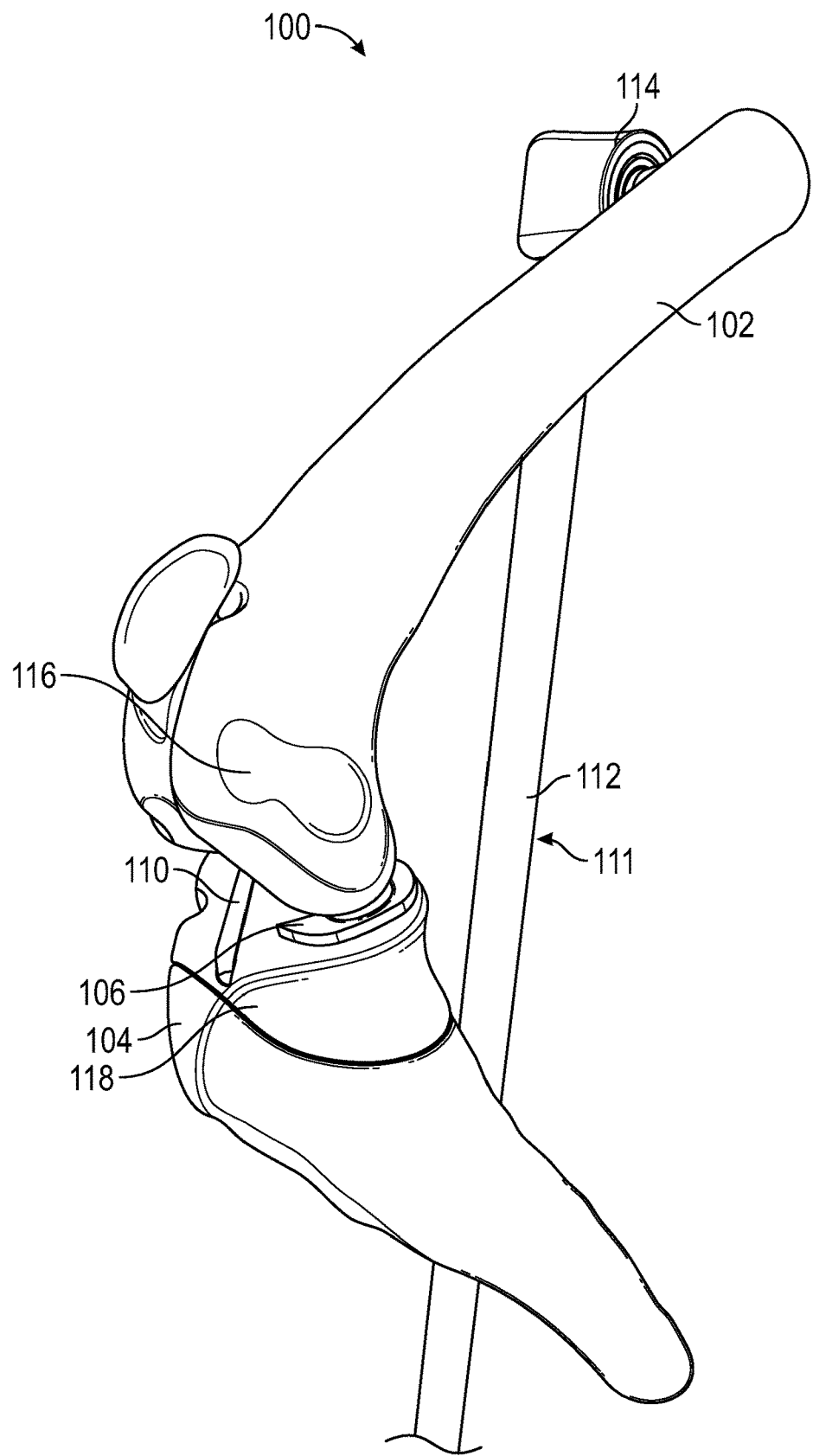
FIG. 1 shows an example of a model showing healthy, partial flexion.

It should be understood that the appended drawings are not necessarily to scale, presenting a somewhat simplified representation of various features illustrative of the basic principles of the disclosure. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The present disclosure will now be described more fully hereinafter with reference to the accompanying drawings, in which preferred embodiments are shown. This disclosure may, however, be embodied in many different forms and should not be construed as limited to the embodiments set forth herein. Rather, these embodiments are provided so that this disclosure will be thorough and complete, and will fully convey the scope to those skilled in the art.

Embodiments described herein are directed to systems, methods and apparatus for demonstrating, using one or more models, surgical procedures, such as osteotomy surgical procedures.

Embodiments of the present disclosure advantageously provide three dimensional, transforming demonstration models that illustrate the way different osteotomy surgical procedures change the geometry of the relevant bones from a pre-surgical state to a post-surgical state.

FIGS. 1-24 depict a demonstration model, in accordance with embodiments of the present disclosure a representation of benthic-pelagic coupling processes. FIGS. 1-24 provide a composite view of the model and are collectively discussed prior to a discussion of each of the figures individually. The model provides for enhanced instructional demonstrations of a pre-operative configuration, a surgical procedure, and a post-operative configuration. This model provides favorable pre-operative instruction to surgeons and patients and members of the patient's family.

Therefore, as shown in FIGS. 1-24, certain embodiments of the present disclosure provide a three dimensional, transforming model used to demonstrate the role of the cranial cruciate ligament in a dog's knee, the destabilizing effect that a tear of the ligament has on the knee, and the way that a tibial plateau leveling osteotomy (TPLO) surgical procedure changes the joint geometry to return the knee to a stable condition. Understanding knee injuries requires an understanding of the anatomy of the joint. The stifle, or knee, is the joint in between the femur and the tibia. Between the two bones (femur, tibia) lies a cushion called the meniscus, which is composed of two substantially C-shaped pieces of cartilage. The stifle joint (knee) is stabilized by a series of ligaments: the cranial and caudal cruciate ligaments, the medial and lateral collateral ligaments, and the patellar ligaments.

In the case of a dog, veterinarians can diagnose damage to the caudal cruciate ligament by evaluating the stifle for signs of instability. Diagnosing tears of the caudal cruciate ligament is more difficult than diagnosing ruptures of the cranial cruciate ligament, because unless the damage is severe and includes multiple ligament injury, laxity in the joint is often less obvious. Radiographs may be helpful in diagnosing this condition. For humans, doctors can make this evaluation using similar imaging and diagnostic techniques.

Small bone opacities may associate with tearing of the ligament may be present on the x-rays, and in certain views of the stifle, the tibial plateau may be displaced. Arthroscopy can also be used and is one way to get a definitive diagnosis.

Embodiments described herein disclose an enhanced technique to improve the outcome of surgeries on the knee. This is achieved using a model of a bones, plates and ligaments. The model may be for example, a facsimile, a replica, representation or likeness of the bone, ligaments and other bones, flesh, ligaments and components of an actual patient (human or animal).

Figure 20:
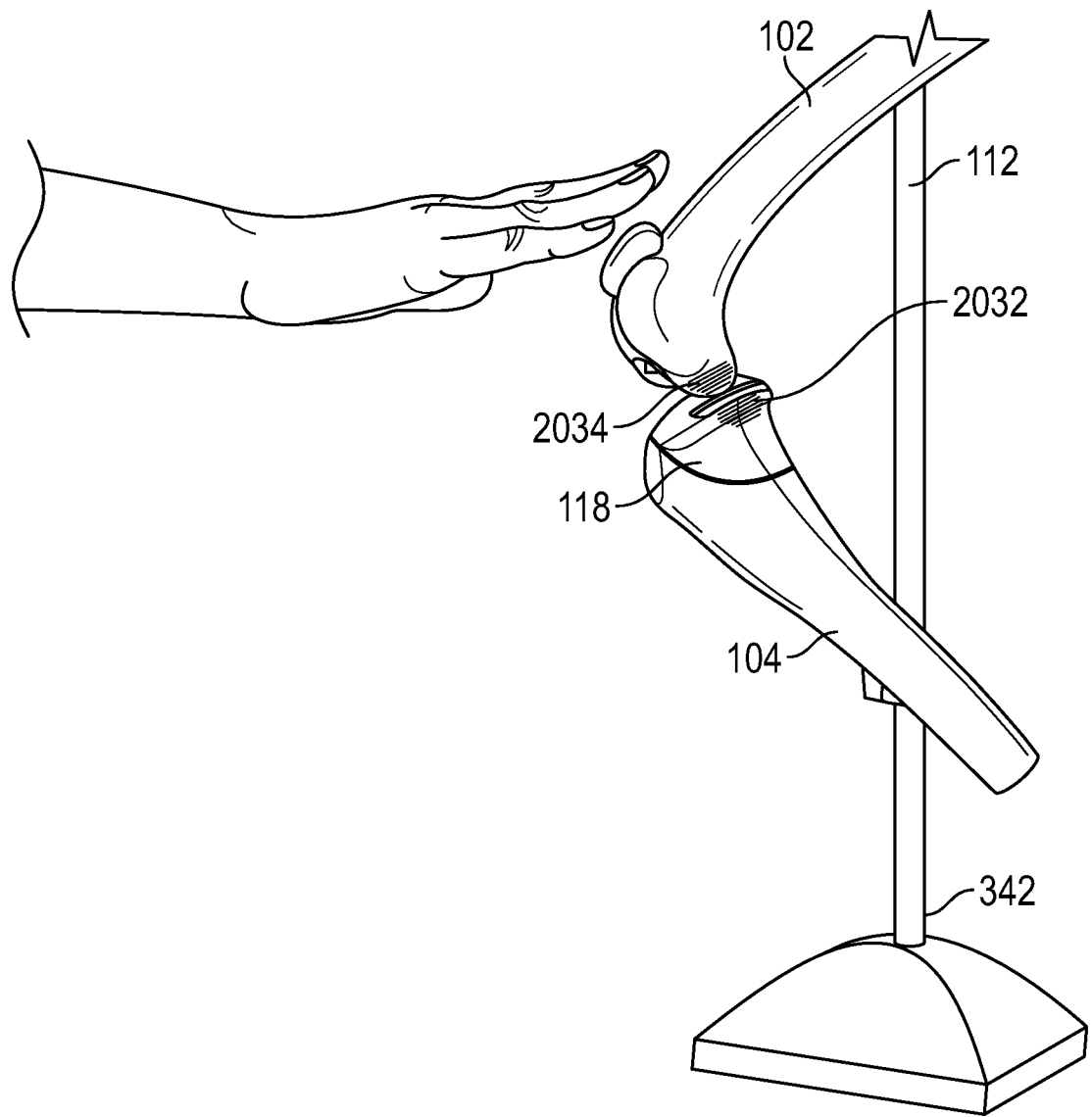
FIG. 20 shows an example of an injured, partial flexion, no-force applied showing movement, model according to embodiments described by this disclosure.

This model is used for instructional purposes to teach surgeons the proper surgical technique as well as explain to patients and pet owners the process and technique as well as recovery and post-operative care. This includes providing a priori insight to the surgeon of the degree of severity of the condition of the patient. The model can be modified, as shown in FIG. 20 herein to individually illustrate a particular patient. Thus, when the surgery begins, the surgeon has already completely modelled the desired outcome based on the model for that specific patient. This a priori knowledge of the specific patient and model generated may be based, at least in part, on imaging, X-ray, ultrasound or other pre-operative diagnostic procedure. These pre-operative imaging procedures enable the surgeon to plan the surgery using the plastic model structure described herein. Thus, a small dog model may be different than a model for a large dog. The model may also be specific to the physical characteristics of the dog.

The model structure can be fabricated to the exact dimensions and characteristics of the specific patient. This approach has the advantage that the surgeon will know exactly the size and characteristics of the patient prior to the surgery. The model, as described herein can be customized to include patient-specific characteristics, such as scar tissue, bone spurs, calcium deposits, prior broken bones and other characteristics of the patient, which may be based, at least in part, on the patient's medical history.

Other embodiments provide different canine osteotomy surgical procedure demonstration models, while further embodiments provide human osteotomy surgical procedure demonstration models, such as, for example, an anterior cruciate ligament (ACL) demonstration model, etc.

A three-dimensional model for demonstrating an osteotomy surgical procedure includes a representation, facsimile, or replica, of a first bone, a representation, facsimile, or replica second bone including a displaceable osteotomy element having at least one embedded magnet and a body having at least one embedded magnet, a bone plate magnetically couplable to the displaceable osteotomy element and the body of the facsimile of the second bone, and a support including a first element coupled to the facsimile of the first bone, and a second element coupled to the facsimile of the second bone.

In many embodiments, the replicas of the bones, displaceable osteotomy element, and support elements are made from wood, fiberglass, plastics, polymers, polymer composites, resin or other suitable material using, for example, a 3D printer, a set of molds, or other suitable fabrication devices or processes.

The replicas of the bones and ligaments and tissues may also be fabricated from injection molding using molds and liquid plastic material that hardens. Other suitable materials may also be used to fabricate the components of the model.

The bone elements may also be actual bone obtained from a specimen and preserved using a preservation technique and preservation materials. Thus, in this embodiment, the bone elements may be actual bone material that has been treated, such as by chemical treatment and used in the model as described herein.

In one embodiment, a TPLO demonstration model includes a femur, a tibia including a displaceable osteotomy element having at least one embedded magnet and a body having at least one embedded magnet, a bone plate magnetically couplable to the displaceable osteotomy element and the body of the tibia, a replaceable cranial cruciate ligament coupled to the femur and the displaceable osteotomy element, and a support including a vertical member, a fixed element rotationally coupled to the femur, and a movable element, displaceable along the vertical member, rotationally coupled to the body of the tibia. The model can show the effects of force applied to the knee, which illustrates how the bones will respond to force.

The ligament 110, which may be a ruptured ligament, may be replaced to repeat the demonstration with various pre-operative and post-operative states. The model can be used for a surgeon to perform the surgical procedure on the model as many times as desired prior to performing the surgical procedure on an actual patient.

Embodiments described herein disclose the role of force, or weight, or pressure on a patient (canine or human, or other animal) that may have caused or contributed to the injury and how the force, weight, or pressure will be factored in to the post-surgical status of the patient. Also, the embodiments, while described as a surgical model, apply to modelling prosthetics and joint replacement surgical procedures. The modelling can be used to imitate the outcome of a prosthetic limb, such as an artificial leg, arm, etc. The model can also be used to ensure the proper artificial organ or body part is used. For example, a replica of a pediatric arm can be used to ensure the correct dimensions for a brace or support is used.

It is also an embodiment of the present disclosure that as a patient grows, the model can show the change in dynamic relationship between the bones. For example, a surgical procedure on a puppy can be modelled to provide an indication of the results of the surgery when the puppy matures into a full-grown dog. This is achieved by using larger-sized bone replicas and using different force calculations based on an increase in weight of the dog as well as an increase in the overall size and stature of the dog.

There is also a procedure for manufacturing the model based on projected growth patterns of the patient. For example, a pure-breed dog has an estimated full-grown weight and height. This can be used to fabricate the bones, such as a femur, tibia, meniscus, and other parts. An alternate embodiment is when the dog is a mixed breed, an analysis of the various types of breeds in the dog may be used to generate a model projecting the height and weight of the dog at full maturity.

The femur, tibia, displaceable osteotomy, bone plate and ligament may be replicas, reproductions, facsimile, or actual bone, cartilage, and ligaments.

The displaceable osteotomy element 118 is an upper or top portion of the tibia. This portion of the displaceable osteotomy element 118 rotates on a magnetic hinge. The displaceable osteotomy element 118 is also referred to herein as displaceable osteotomy element 118, or upper portion of the tibia 104, or tibia upper portion.

The magnet (not visible in the figures) allows the demonstration to be performed and the bones to be held in place. This provides correct orientation to show normal position of the tibia, femur and other bones. The model can be specific to a particular breed of dog. For example, a smaller model may be used for a smaller dog. Once the ligament 110 is cut, instability of the knee is demonstrated.

The magnets are not readily visible since the magnets are inside the associated portion of the particular bone. For example, there are magnets in the upper portion of the tibia, which is also referred to as the displaceable osteotomy element 118. Magnets may also be located in a distal portion 116 of the femur 102. The position and strength of the magnets is such that the femur 102 and tibia 104 may be held in place while a demonstration of the surgery is taking place. The bones, femur 102, tibia 104, meniscus bone plate 106 are represented in three-dimensions so all views and angles of the bones is readily apparent to an observer. One of skill in the art will appreciate that while not readily visible, the magnets are placed inside the related bones shown as elements 118 and 116 in the figures.

After the ligament in the model is replaced, the post-surgical state of the knee is demonstrated. It is shown that the knee has a first position associated with a pre-operative state, or pre-operative position, and a second position associated with a post-operative state, or post-operative position. The role of weight, or force or pressure is factored into the desired post-operative state since the application of weight when standing or walking or running is a consideration.

The pre-operative position is used to show the extent of the injury, or damage, and the relative severity of the condition. This provides insight as to how the doctor should proceed with the corrective procedure.

The post-operative position is used to show the desired or expected position of the bones, cartilage and ligament following the surgery. By using the model customized for the specific patient, the surgeon is able to accurately align the bones and ligament so that the proper anatomical relationship results after the procedure. With the post-operative position modelled, the doctor is able to identify the proper or desired position of the post-operative state. This enables the surgeon to know the relative positions for a satisfactory procedure. As stated above, the role of force, weight or pressure or any combination of the three is considered so that the patient is able to stand, walk or run without undesired displacement of the bones, such as femur, tibia, meniscus, etc.

In one embodiment, the bone plate includes at least one embedded magnet; in another embodiment, at least a portion of the bone plate is a ferromagnetic material. The cranial cruciate ligament includes two ends that are coupled to the displaceable osteotomy element using a cleat. The dimensions of the bone plate and the length and thickness of the ligament can be known a priori and the procedure can utilize that a priori knowledge to perform the surgery with optimal results.

In addition to the fabrication processes and materials described above, in some embodiments, the femur, tibia, displaceable osteotomy, bone plate, support member and support elements are made from plastic using, for example, a 3D printer, a set of molds, etc.

The cranial cruciate ligament is made from a material that may be cut with scissors or a knife, such as, for example, fiber, cloth, string, or fibrous material, etc. Other suitable materials may also be used.

The TPLO demonstration model articulates to facilitate illustration of the normal bending of the knee joint. The knee joint can be fixed in place at any position from full flexion to full extension. Additionally, the TPLO demonstration model transforms from the healthy state, to an injured, pre-operative state, and finally to the post-operative state. Advantageously, the TPLO demonstration model illustrates, inter alia, the normal action of the knee joint and the normal role of the cranial cruciate ligament; the effect of a cranial cruciate ligament tear on the stability of the knee; and the steps of the TPLO surgical procedure, and how the procedure restores the stability of the joint.

The cranial cruciate ligament (110) attaches to the femur (102), by encircling an axle pin, and attaches to the displaceable osteotomy element (118), of tibia (104), by passing through a tunnel (364) in the displaceable osteotomy element (118) to the lateral aspect of the element where there is a cleat (220), which may be a clam cleat, self-locking cleat, post, etc., to which the displaceable osteotomy element (118) is secured.

The cranial cruciate ligament is designed to be cut during the demonstration to simulate a ligament tear. After the demonstration, the pieces of the cut ligament are removed and a new, replacement ligament is installed in the TPLO demonstration model. This demonstration provides a useful teaching tool to show how to replace the ligament.

The demonstration can also be used to illustrate any abnormal wear patterns or deformities in the bone structures around the ligament, such as the femur, tibia and/or displaceable osteotomy. The patient-specific characteristics of the ligament can also be demonstrated and modelled prior to the actual surgical event. This helps the surgeon precisely operate on the exact ligament that the patient has.

The attachment between the femur and tibia is a "pin slot" joint (720, 722) such that, when the cranial cruciate ligament 110 is cut or removed, the joint undergoes cranial-caudal sliding to replicate pathologic "drawer" motion. The proximal tibial fragment element, i.e., the displaceable osteotomy element, can be transformed from the normal, anatomic position, to the rotated, post-operative position.

The cranial and caudal cruciate ligaments cross over the front of the stifle joint and are responsible for keeping the tibia from sliding too far forward, or too far backward, respectively. The medial and lateral collateral ligaments lie on either side of the knee, with the lateral being on the outer aspect of the joint, and the medial on the inner aspect. These two ligaments function to stabilize the sides of the joint and keep the bones from sliding away from each other in a medial or lateral direction when the stifle is extended.

The patellar ligaments are those that hold the patella, or kneecap, in place and allow for its movement when extending and flexing the knee.

The caudal cruciate ligament keeps the tibia from sliding too far caudally (backward) when the knee is flexed. It works in concert with the cranial cruciate to provide rotational stability to the joint. The caudal cruciate ligament is analogous to the posterior cruciate ligament (PCL) in humans. Injury to this ligament can result in partial or complete tears, and the subsequent instability caused progressive degenerative joint disease (DJD), or arthritis in the stifle joint.

The TPLO demonstration model includes hidden magnets that allow the proximal tibial fragment element to remain fixed in either position and a bone plate. Once the tibia is transformed to the post-operative state, the bone plate attaches to the tibia via hidden magnets.

FIG. 1 shows an example 100 of a model showing healthy, partial flexion.

The model 100 includes a femur 102, a tibia 104 including a displaceable osteotomy element 118 having at least one embedded magnet and a body having at least one embedded magnet, a meniscus bone plate 106 magnetically couplable to the displaceable osteotomy element 118, which is an upper portion of the tibia 104 and the body of the tibia 104, a replaceable cranial cruciate ligament 110 coupled to the femur 102 and the displaceable osteotomy element 118, and a support 111 including a shaft 112, a fixed attachment portion 114 rotationally coupled to the femur 102, and a movable element (not shown in FIG. 1), displaceable along the vertical member, or shaft 112, rotationally coupled to the body of the tibia 104.

The support 111 and shaft 112 enable the femur 102 and tibia 104 and meniscus bone plate 106 to be moved in a vertical fashion, up and down, to show the effect of motion on the bones. The support 111 and shaft 112 permit some transverse motion to imitate or replicate the normal transverse motion of the patient. The amount of transverse motion is modifiable based on the patient the model is replicating. Magnets are located at 118, 116 and meniscus bone plate 106 may also be a magnet.

The femur 102 may be a replica of a femur bone, an actual femur bone, obtained, for example, from a specimen, or a fabricated model of a femur bone.

The tibia 104 may be a replica of a tibia bone, an actual tibia bone, obtained, for example, from a specimen, or a fabricated model of a tibia bone.

The displaceable osteotomy element 118 has a first position associated with a pre-operative state as shown herein and a second position associated with a post-operative state as shown herein. In one embodiment, the meniscus bone plate 106 includes at least one embedded magnet; in another embodiment, at least a portion of the meniscus bone plate 106 is a ferromagnetic material. The cranial cruciate ligament 110 includes two ends that are coupled to the displaceable osteotomy element 118 using a cleat 220.

The cranial cruciate ligament 110 may be fabricated from a suitable material such as rope, twine, string or other fibrous material with desired characteristics to imitate or have similar physical characteristics as a mammal ligament.

As shown in FIG. 1, the model 100 is shown as a healthy, partial flexion position. This position is partially bent, or the action of partially bending at the joint between the femur 102 and the tibia 104.

The model is fabricated based on a specification for a patient. The fabrication may be a generic size and having generic dimensions. Alternatively, the model may be fabricated to specific specifications related to a specific breed of dog or a specific patient.

Figure 2:
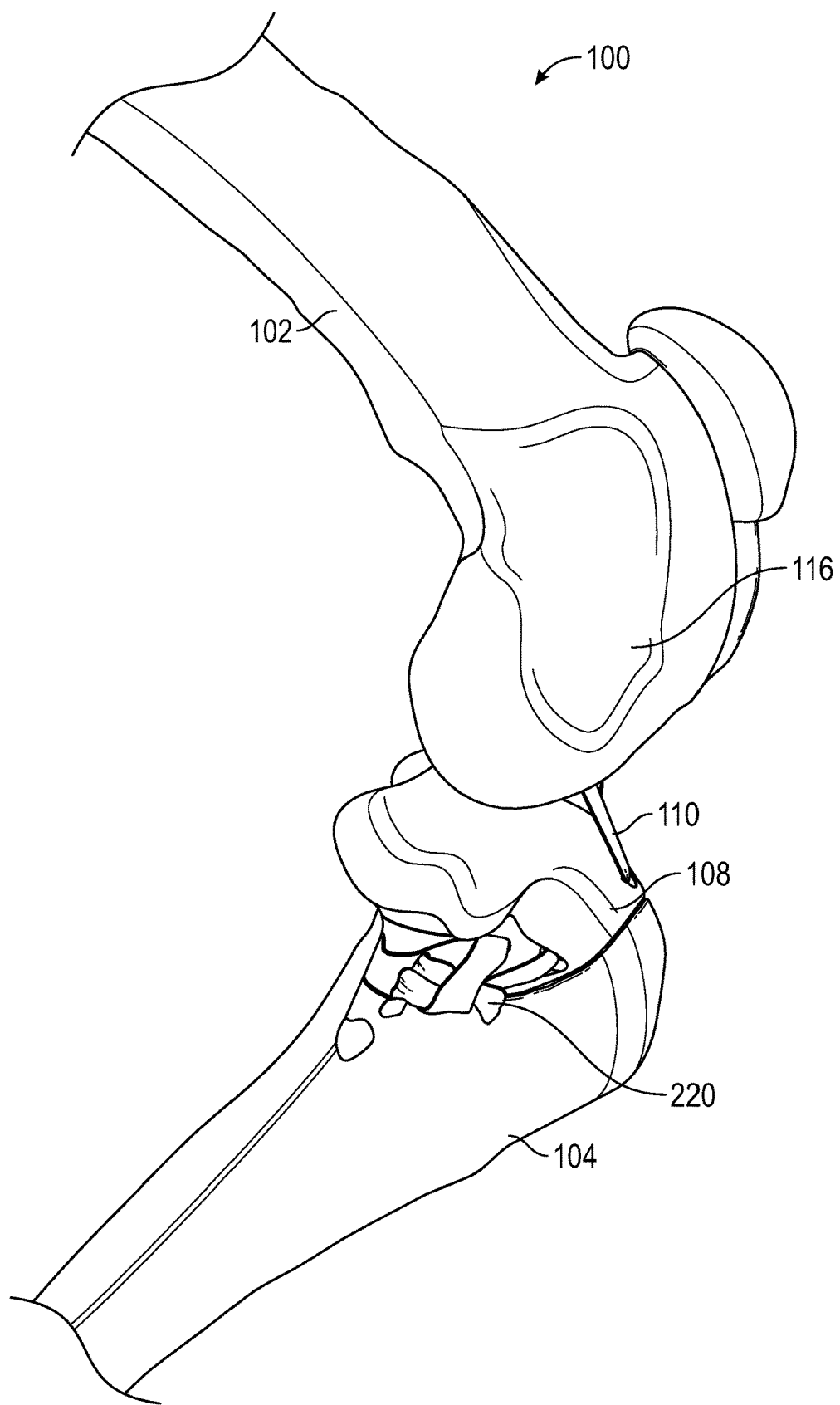
FIG. 2 shows another view of an example of a model showing healthy, partial flexion.

FIG. 2 shows another view of an example of a model 100 showing healthy, partial flexion. The healthy, partial flexion embodiment shows a distal portion 116 of a femur 102. The ligament 110 is shown as well as cleat 220 in tibia 104. A rear-view of a magnet for element is shown in FIG. 2. The ligament fiber 110 has flexibility to replicate the motion of a bend, or joint in a leg with femur 102 and tibia 104. The cleat 220 permits replacement of the ligament 110 to show how to repair damage to the ligament 110.

The magnets for elements 106, 108, 116 and 118 may be used in an embodiment in which multiple magnets are desired. Alternatively, any subset of magnets for elements 106, 108, 116 and 118 may be used and paired with a metal plate, or metal surface that has desired magnet attraction properties.

When a plurality of magnets for one or more of elements 106, 108, 116 and 118 are used, the number and polarity of the magnets for elements 106, 108, 116 and 118 is selected to have the corresponding bones connect to one-another as desired. The meniscus bone plate 106 may be a magnet or may not be a magnet. Furthermore, the use of the number and position of the magnets depends on the instantiation of the model.

Figure 3:
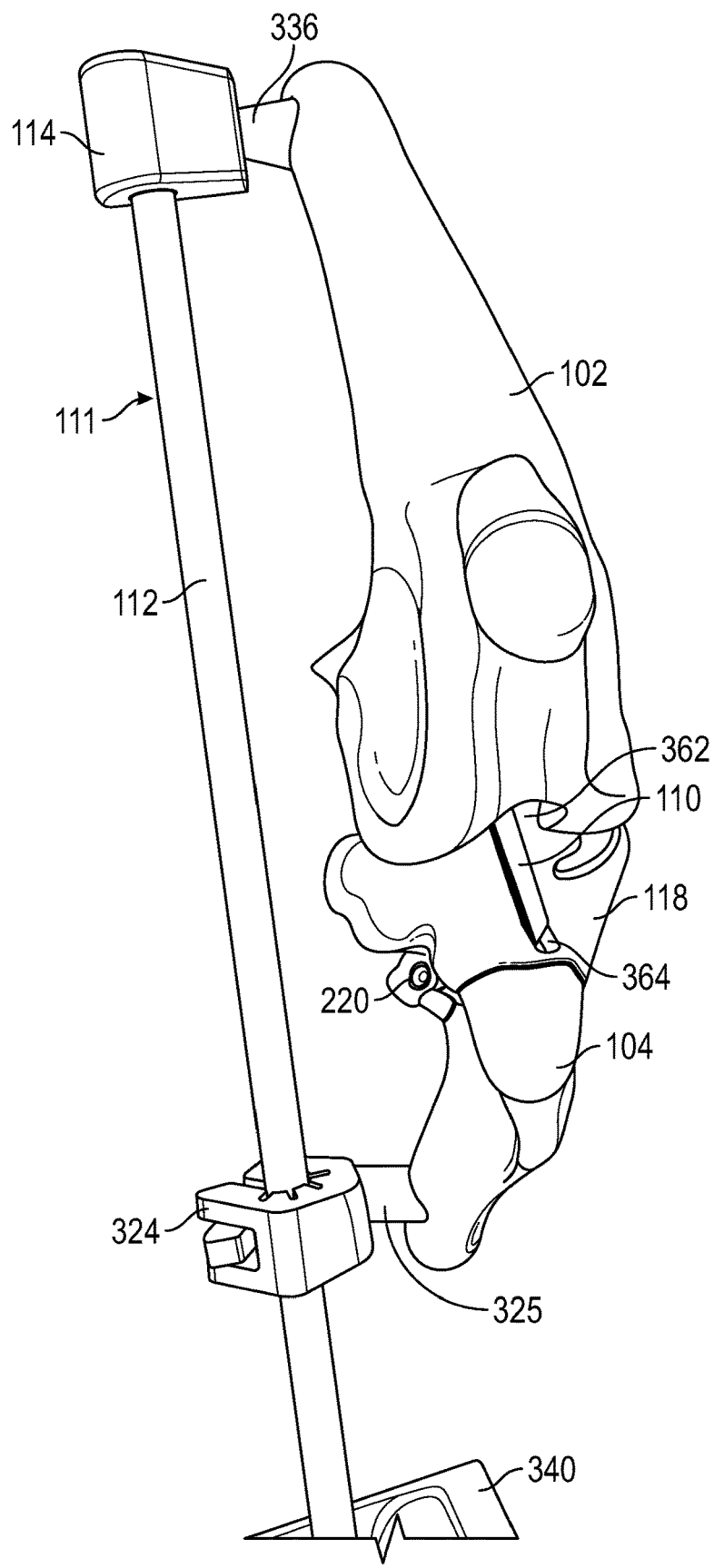
FIG. 3 shows a front view of an example of a model showing healthy, partial flexion.

FIG. 3 shows another view of an example of a model 100 showing healthy, partial flexion. In this embodiment, femur 102 has a connection area 336 that provides a connection or location to affix the femur 102 to attachment portion 114 of support 111. Attachment portion 114 is attached to a first portion (upper portion) of shaft 112 of support 111. The tibia 104 has an attachment portion shown as 325 that attaches to second area (lower portion) of support 111. The support 111 has a base 340 that supports a vertical self-standing demonstration of the flexion of the femur 102 and the tibia 104. The cleat 220 for ligament 110 is also shown, as well as displaceable osteotomy element 118. The cranial cruciate ligament 110 attaches to the femur 102 via tunnel 362, by encircling an axle pin, and attaches to the displaceable osteotomy element 118, which have magnets located on an interior portion of 118, of the tibia 104 by passing through a tunnel 364 in the displaceable osteotomy element to the lateral aspect of the element where there is a cleat 220, which may be a clam cleat, self-locking cleat, post, etc., to which the displaceable osteotomy element 118 is secured.

The components of FIG. 1 show that magnets for elements 116, 118 enable the femur 102, tibia 104 and meniscus bone plate 106 to be held in place in a three-dimensional rendering of the leg structure of a dog.

Figure 4:
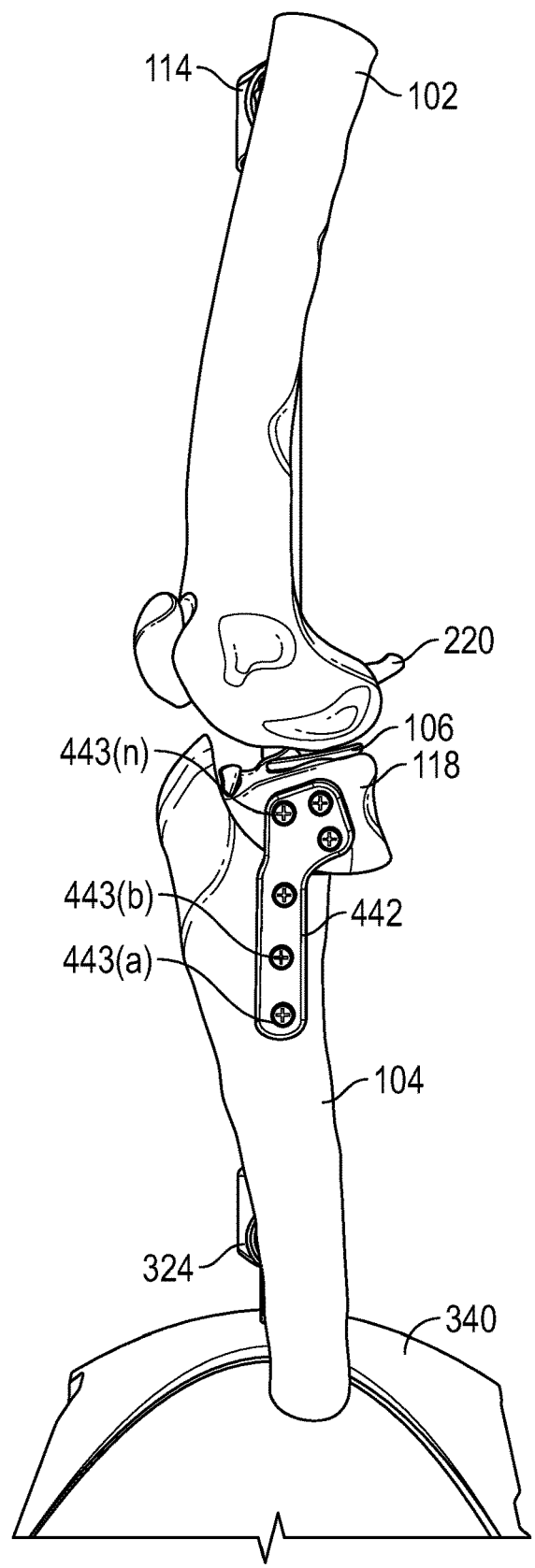
FIG. 4 shows an example of a model showing post-operative, full extension.

FIG. 4 shows an example of a model 100 showing post-operative, full extension embodiment. This is a side view after rotation. As shown in FIG. 4, femur 102 is shown in proximity to tibia 104. The meniscus bone plate 106, which may also be a magnet, is shown disposed on displaceable osteotomy element 118. Brace plate 442 is shown overlaying a portion of tibia 104 and displaceable osteotomy element 118. Screw 443(*a*) . . . (*n*) where "n" is any suitable number are shown affixing brace plate 442 to tibia 104 and displaceable osteotomy element 118. Base 340, attachment portion 114 and lower connector 324 are also shown. Brace plate 442 is used to provide support to displaceable osteotomy element 118 and tibia 104. The placement, or location, of screws 443 (generally) is designed for enhanced support and desired placement of the brace plate 442.

Figure 5:
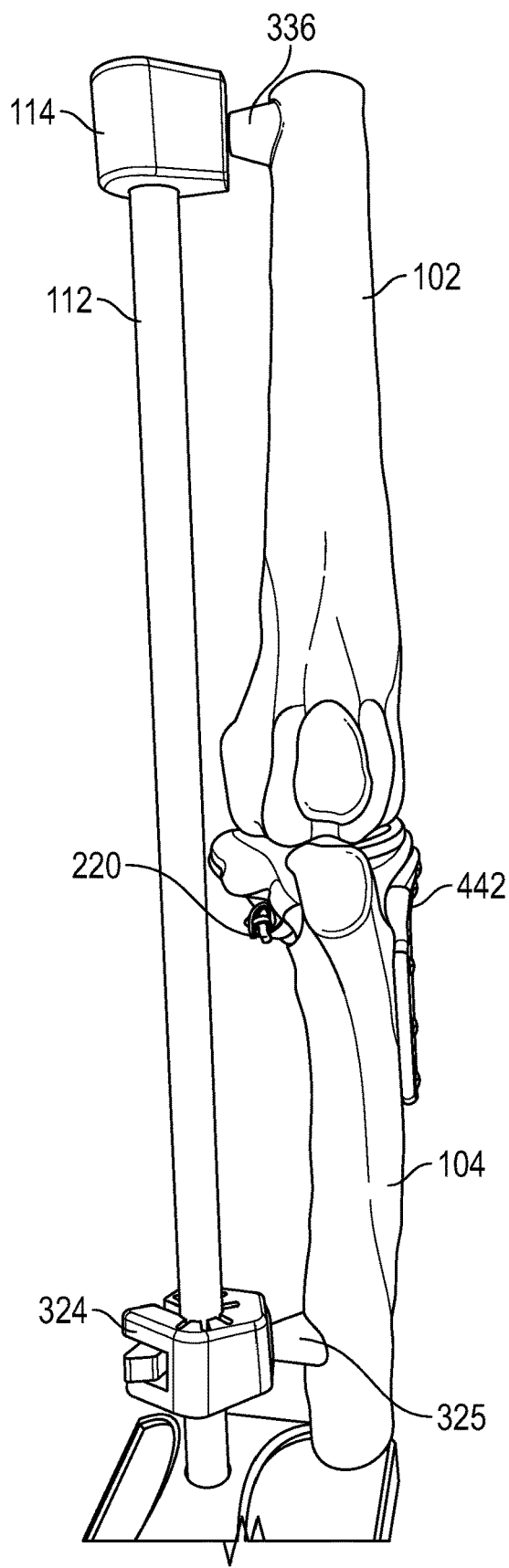
FIG. 5 shows a front view of an example of a model showing post-operative, full extension.

FIG. 5 shows another view of an example of a model showing post-operative, full extension. This shows the correct orientation of the tibia and the femur. The view of FIG. 5 is similar to the view of FIG. 4, except the view of FIG. 5 is a "front" view. That is the model shows the front of the dog's leg. The elements of FIG. 5 have been discussed in relation to FIG. 5. FIG. 5 shows post-operative, full extension. Thus, there is minimal, if any, flexion, or bend in the model leg.

Figure 6:
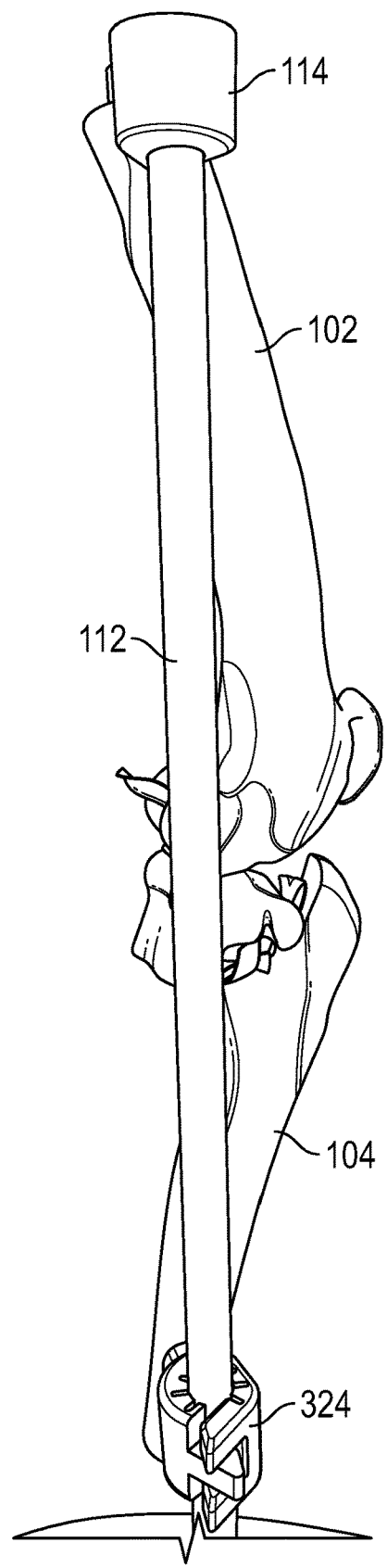
FIG. 6 shows another view of an example of a model showing post-operative, full extension.

FIG. 6 shows another view of an example of a model showing post-operative, full extension. The view of FIG. 6 is similar to the view of FIGS. 4 and 5, except the view of FIG. 6 is a "side" view. That is the model shows the side of the dog's leg. The elements of FIG. 6 have been discussed in relation to FIGS. 4 and 5. FIG. 6 shows post-operative, full extension. Thus, there is minimal, if any, flexion, or bend in the model leg.

Figure 7:
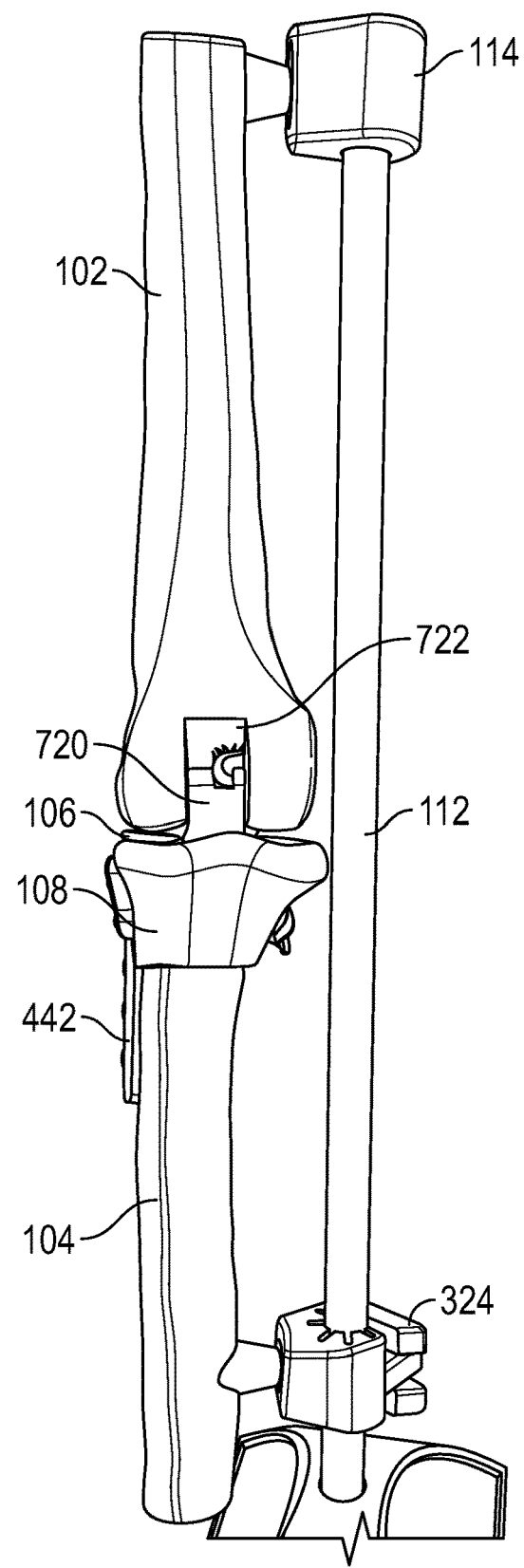
FIG. 7 shows a rear view of an example of a model showing post-operative, full extension.

FIG. 7 shows a rear view of an example of a model showing post-operative, full extension. FIG. 7 shows femur 102 in proximity to tibia 104. The meniscus bone plate 106 is shown disposed on an upper surface of displaceable osteotomy element (shown as element 118 herein). A front view of the displaceable element is shown. Brace plate 442 is shown overlaying a portion of the tibia 104 as well as shaft 112, attachment portion 114 and lower connector 324. A joinder element 720, which is part of the model allows the model to function to show movement of the tibia 104, femur 102 and other parts of the model. The joinder element 720 is used to join the femur 102 and tibia 104, which can be the "pin slot" joint described above.

The cranial cruciate ligament attaches to the femur by encircling an axle pin, and attaches to the displaceable osteotomy element of the tibia by passing through a tunnel in the displaceable osteotomy element to the lateral aspect of the element where there is a cleat, clam cleat, self-locking cleat, post, etc., to which the displaceable osteotomy element is secured.

Figure 8:
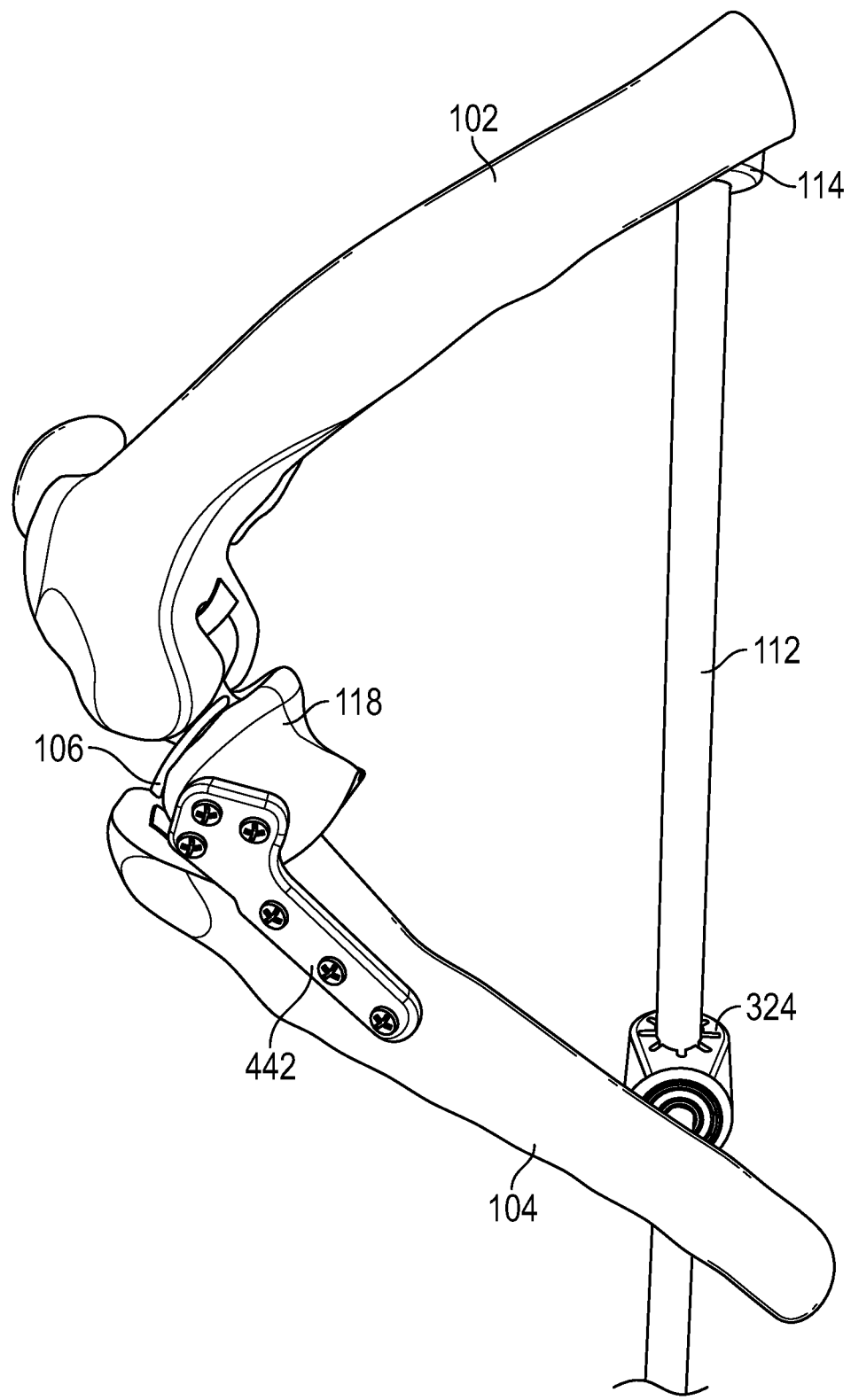
FIG. 8 shows an example of a model showing post-operative, partial flexion.

FIG. 8 shows an example of a model showing post-operative, partial flexion. The model shown in FIG. 8 illustrates that the femur 102 and tibia 104 are flexed, or bent, causing the femur and tibia to be separated. The brace plate 442 is shown providing support to displaceable osteotomy element 118. The other elements have been described previously herein.

Figure 9:
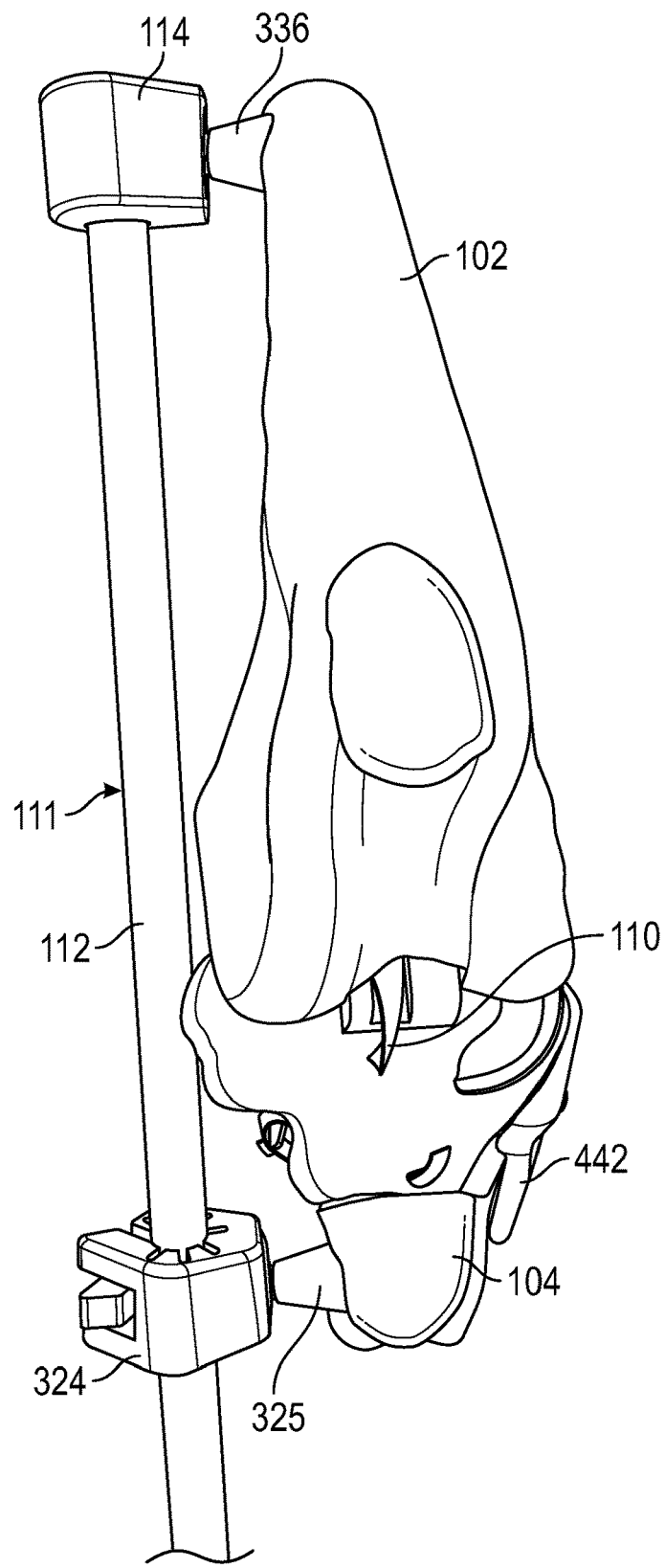
FIG. 9 shows a front view of an example of a model showing post-operative, partial flexion.

FIG. 9 shows a front view of an example of a model showing post-operative, partial flexion. The view shown in FIG. 9 is front-view of partial flexion. The other elements have been described previously herein. The ligament 110 is shown as cut. The ligament 110 may be repaired on the model to demonstrate the procedure. The ligament 110 may be replaced as many times as desired so a surgeon may practice the procedure as many times as desired.

Figure 10:
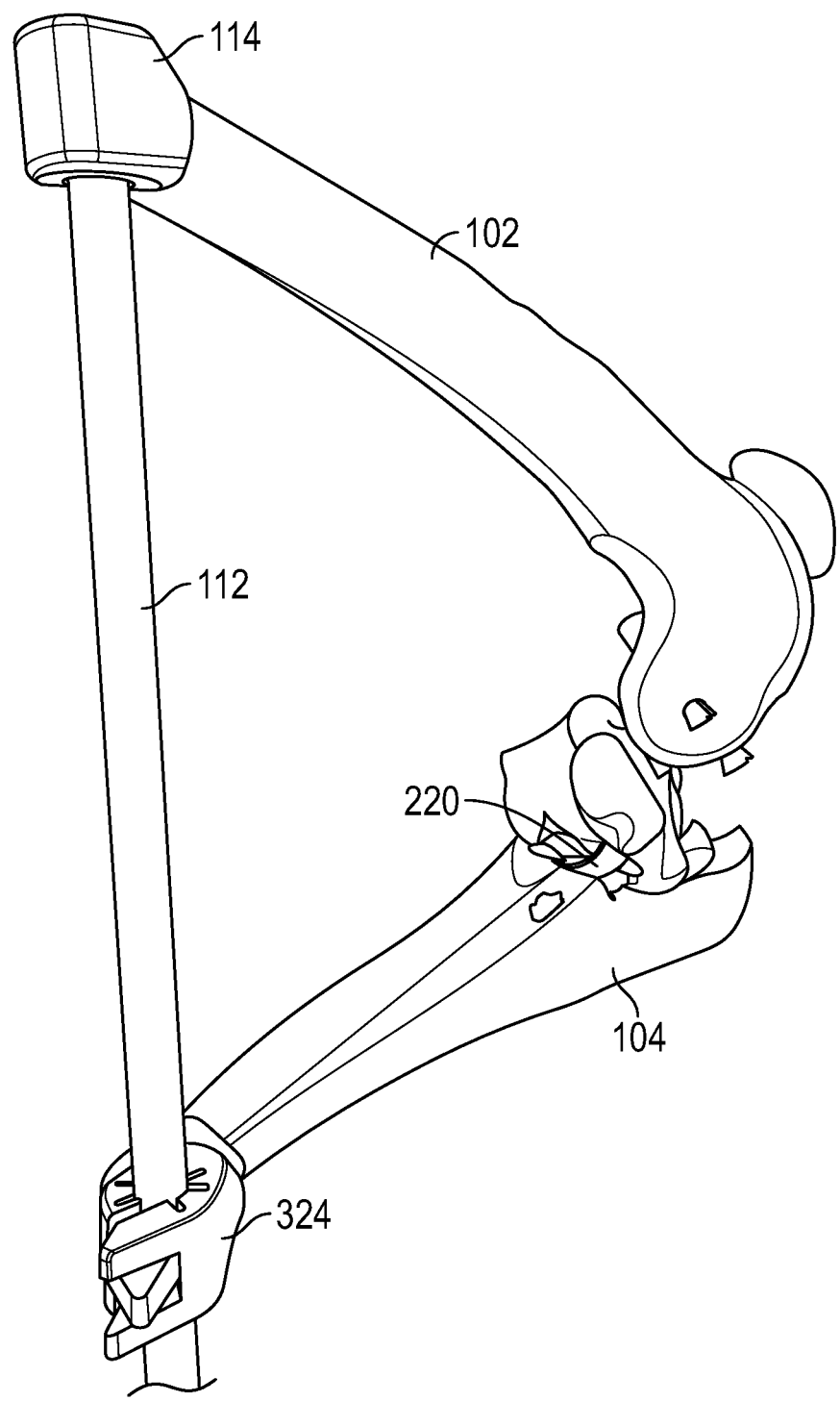
FIG. 10 shows another view of an example of a model showing post-operative, partial flexion.

FIG. 10 shows side view of an example of a model showing post-operative, partial flexion. The other elements have been described previously herein.

Figure 11:
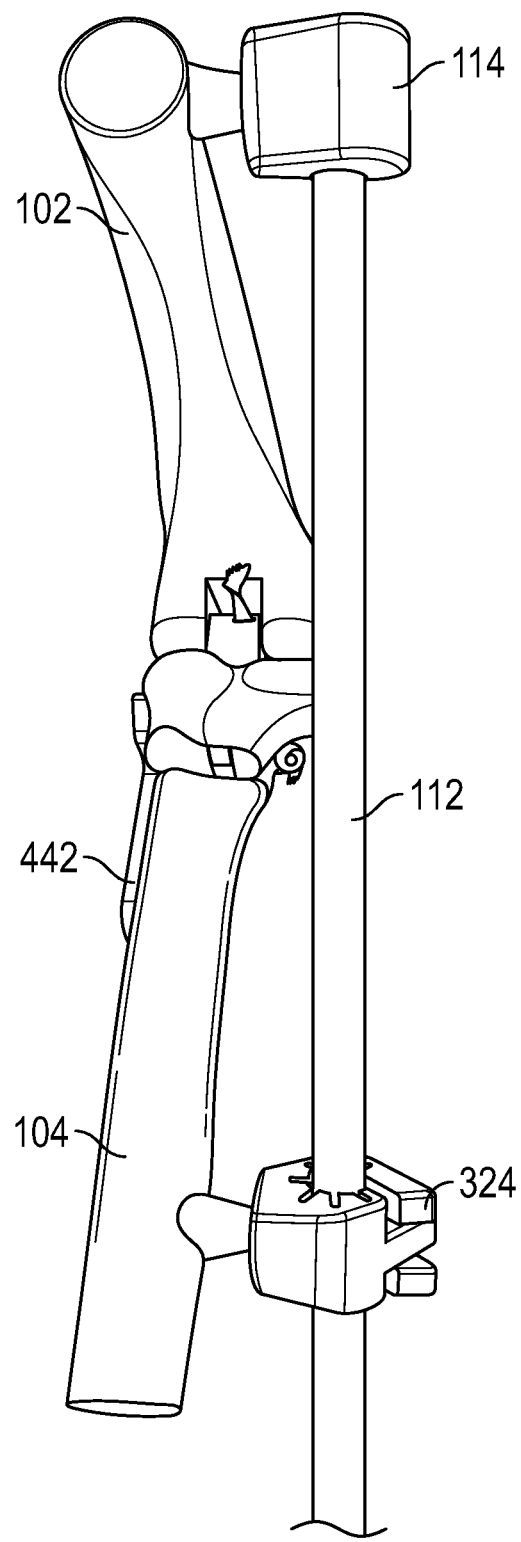
FIG. 11 shows a rear view of an example of a model showing post-operative, partial flexion.

FIG. 11 shows a rear view of an example of a model showing post-operative, partial flexion. The femur 102 and tibia 104 are shown as partially bent relative to one-another. The other elements have been described previously herein.

Figure 12:
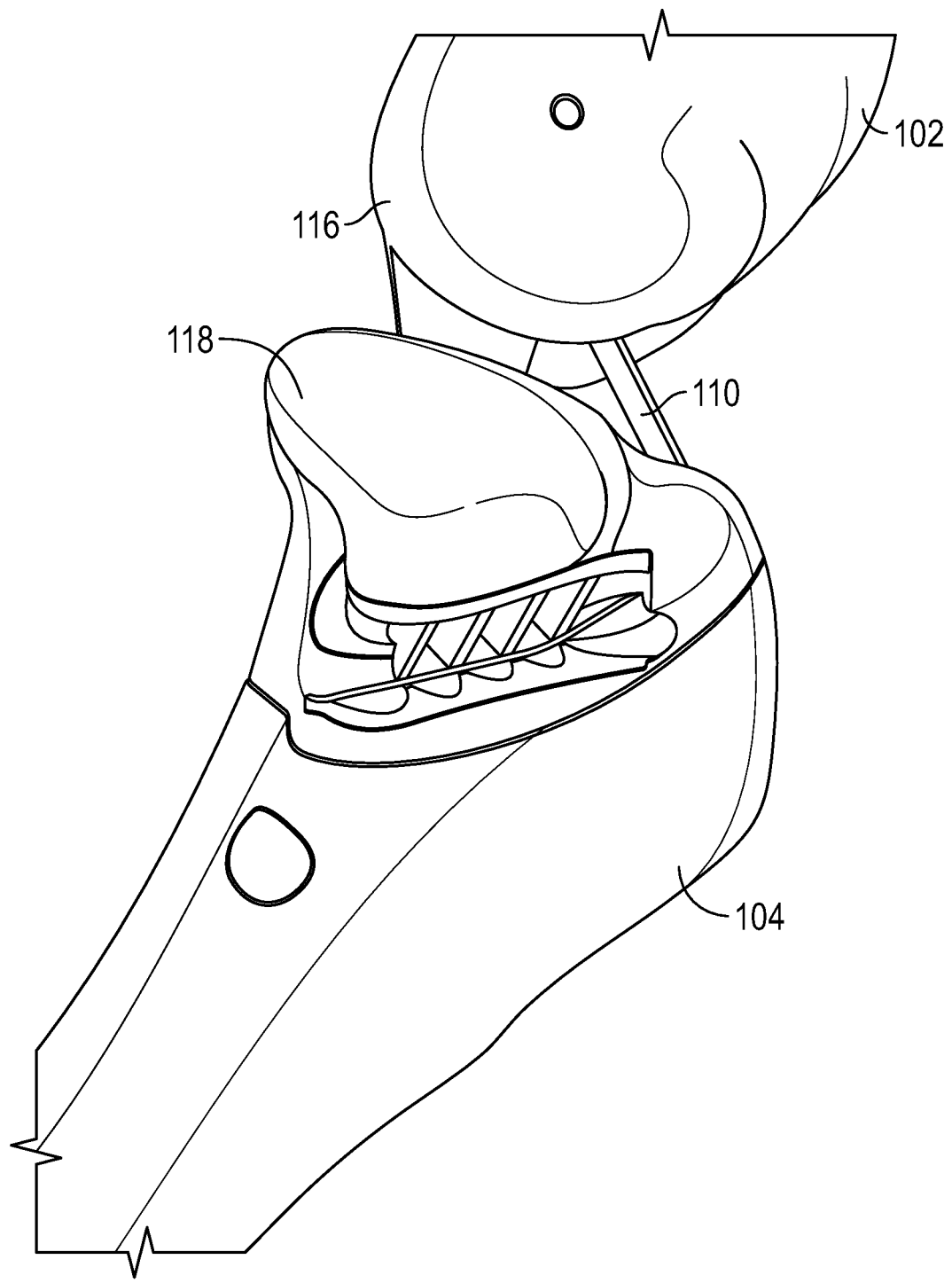
FIG. 12 shows an example of a model showing self-locking cleat.

FIG. 12 shows an example of a model showing self-locking cleat. The self-locking cleat embodiment shows ligament 110, femur 102, tibia 104, displaceable osteotomy element 118 and distal portion 116 of a replica of a femur 102.

Figure 13:
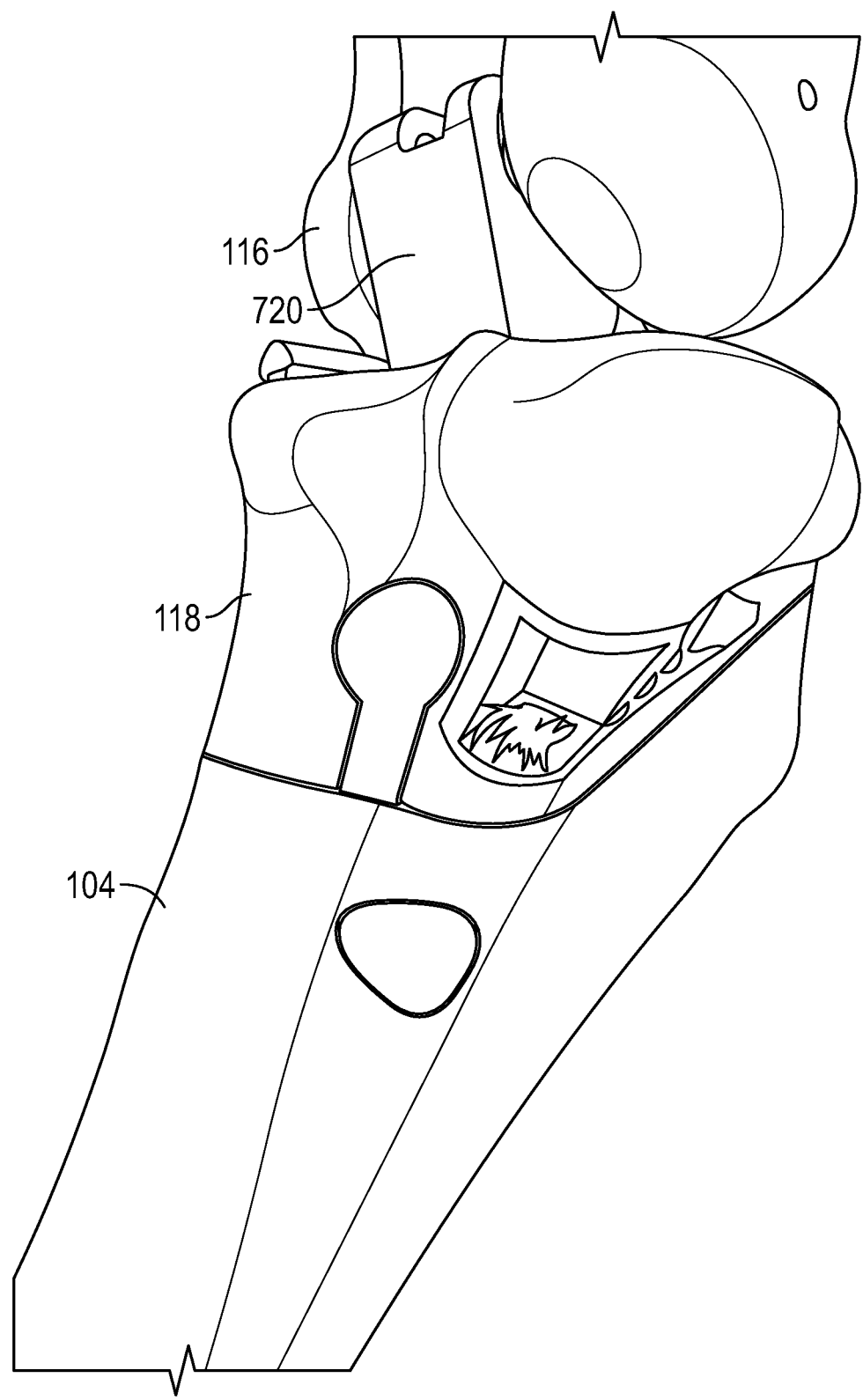
FIG. 13 shows another view of an example of a model showing self-locking cleat.

FIG. 13 shows another view of an example of a model showing self-locking cleat. This view is a close-up view and shows the self-locking cleat of FIG. 12, with enhanced focus on the displaceable osteotomy element 118 and joinder element 720.

Figure 14:
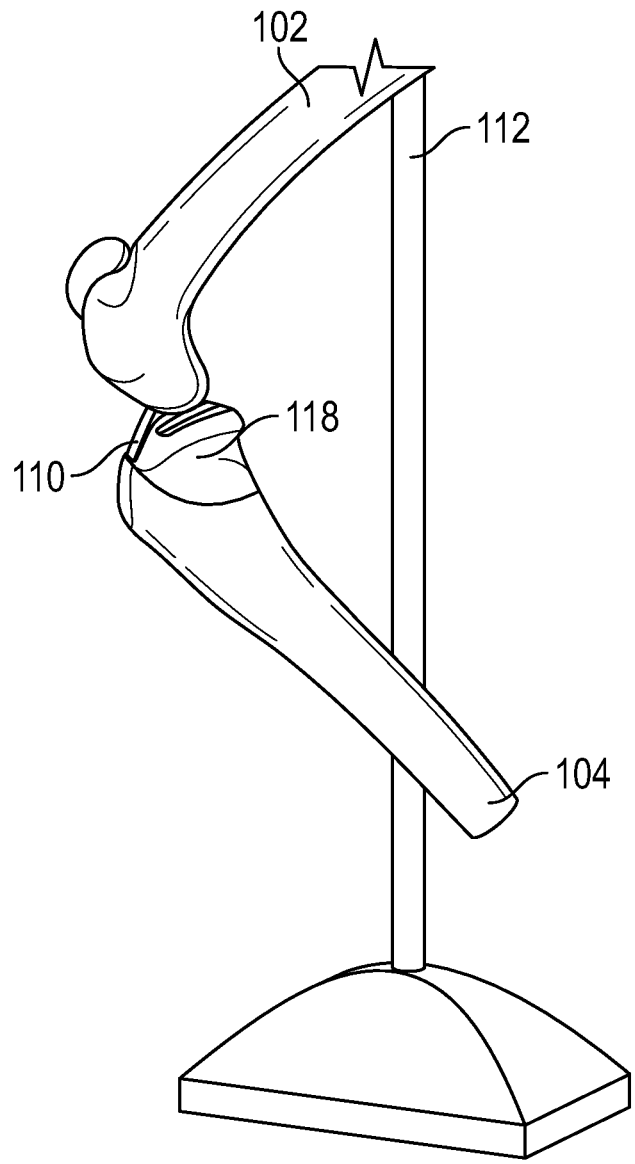
FIG. 14 shows a perspective view of a model showing healthy, partial flexion.

FIG. 14 shows a perspective view of a model showing healthy, partial flexion. The relative positions of the femur 102 and tibia 104 and displaceable osteotomy element 118 are shown as well as ligament 110. Shaft 112 is also shown.

Figure 15:
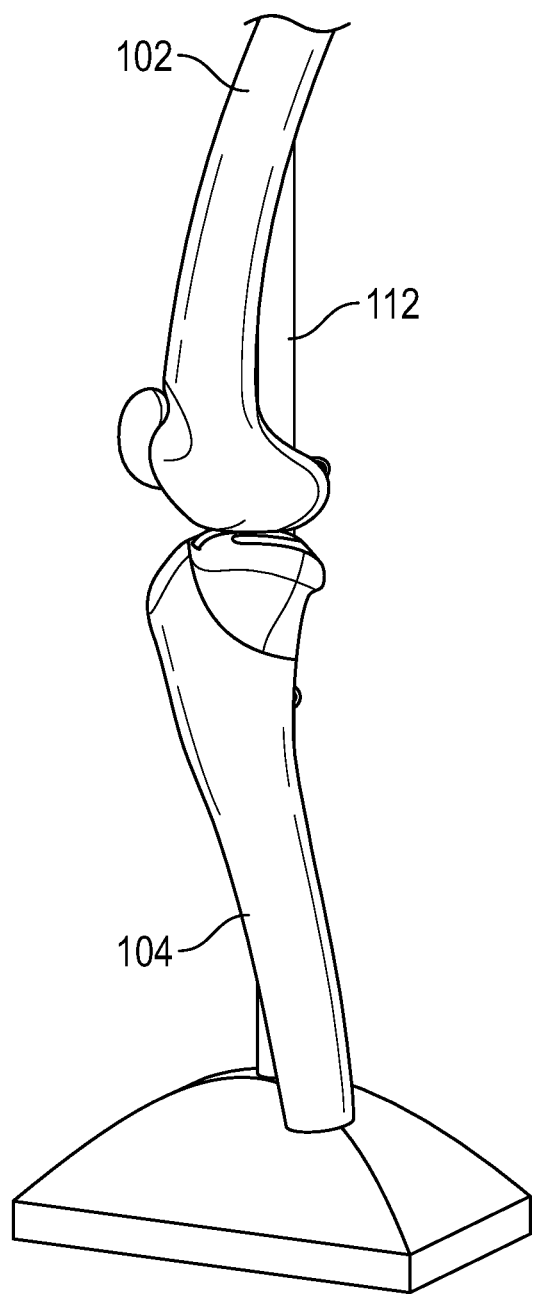
FIG. 15 shows a perspective view of a model showing healthy, full extension.

FIG. 15 shows a perspective view of a model showing healthy, full extension. The relative positions of femur 102 and tibia 104 and shaft 112 are shown.

Figure 16:
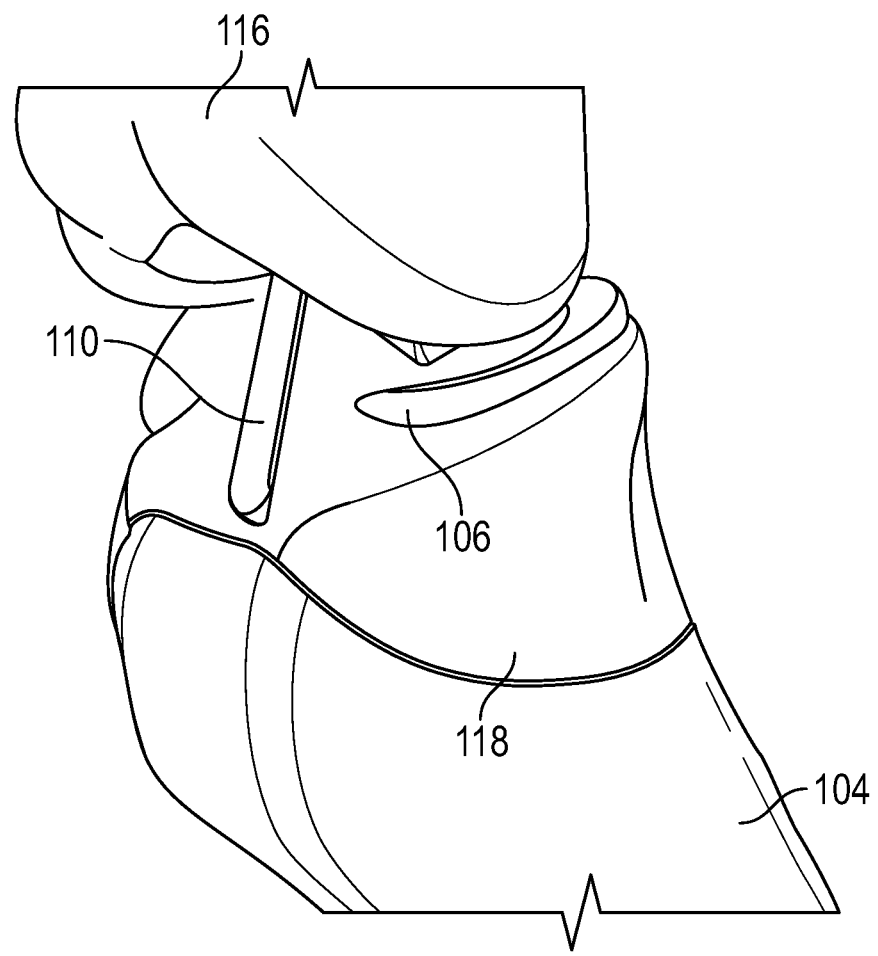
FIG. 16 shows a view of healthy, partial flexion according to an embodiment of the disclosure.

FIG. 16 shows a view of healthy, partial flexion according to an embodiment of the disclosure. As shown in FIG. 16, a close-up view shows the position of ligament 110, distal portion 116, meniscus bone plate 106, displaceable osteotomy element 118, and tibia 104.

Figure 17:
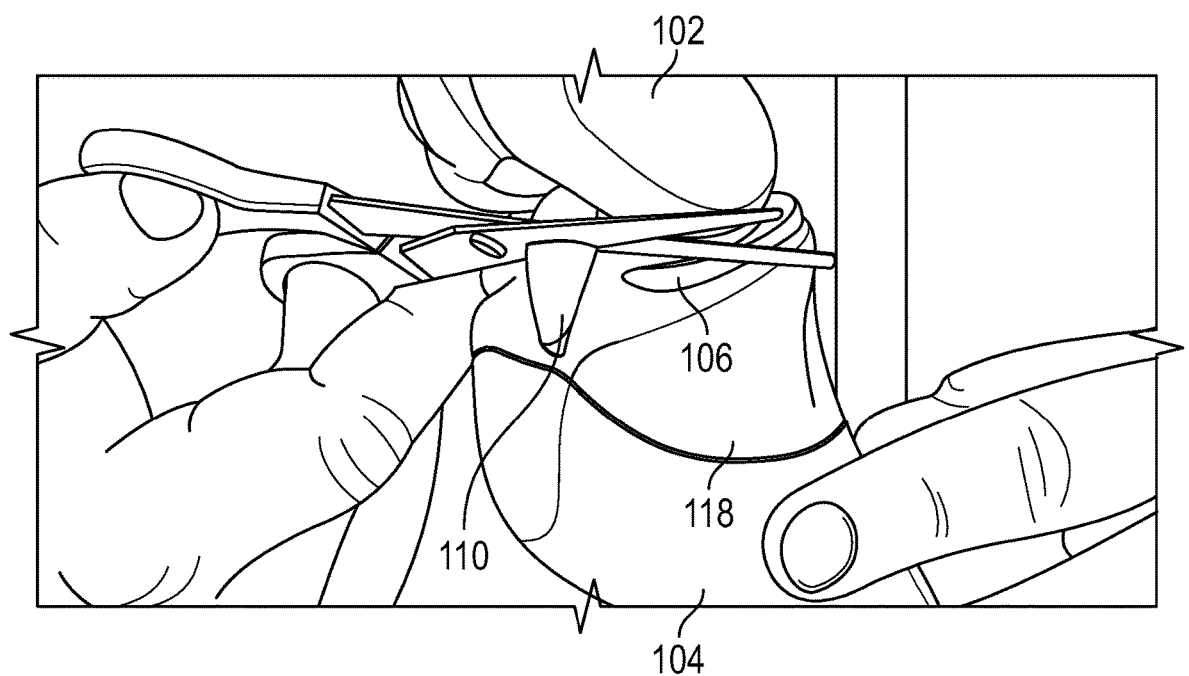
FIG. 17 shows a representation of an injury in progress, partial flexion using a model according to embodiments described by this disclosure.

FIG. 17 shows a representation of an injury in progress, partial flexion using a model according to embodiments described by this disclosure. This figure shows that the ligament 110 is being cut, which represents any similar injuries that may occur to the ligament. The other elements of FIG. 17 have been described previously herein.

Figure 18:
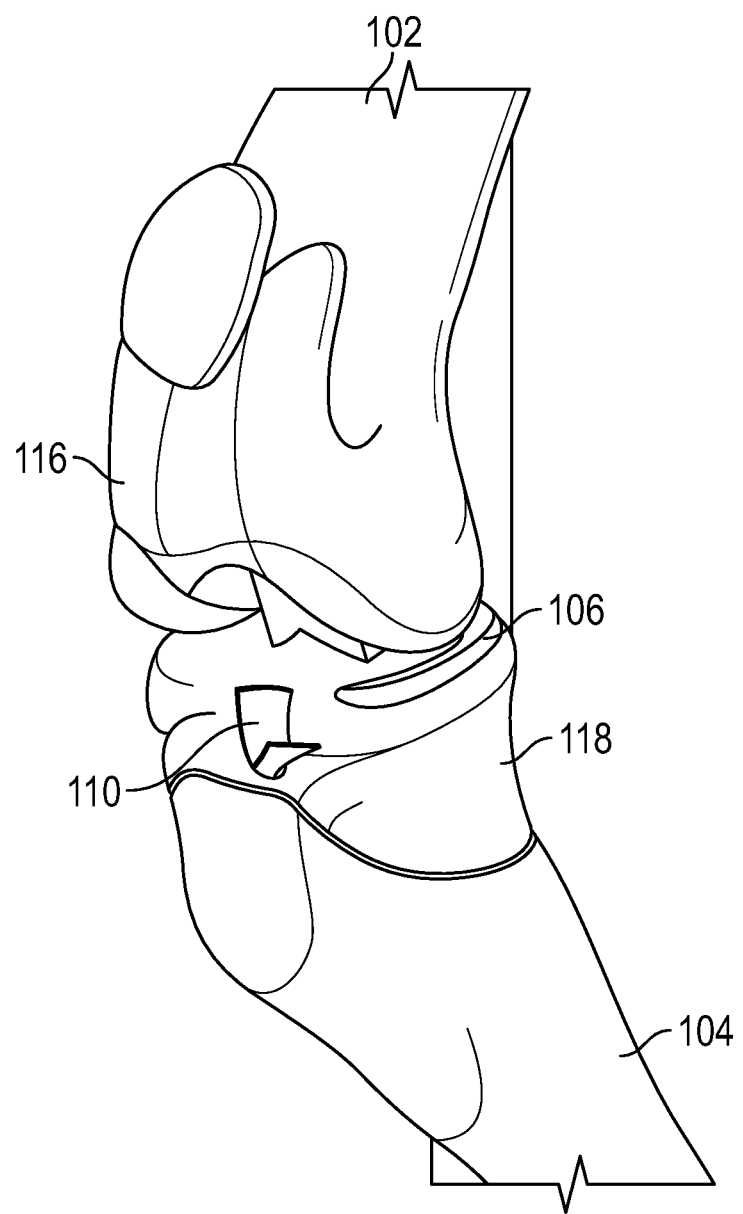
FIG. 18 shows an example of an injured, partial flexion model according to embodiments described by this disclosure.

FIG. 18 shows an example of an injured, partial flexion model according to embodiments described by this disclosure. As shown, there is a cut portion of ligament 110, and no connecting ligament between femur 102 and tibia 104.

Figure 19:
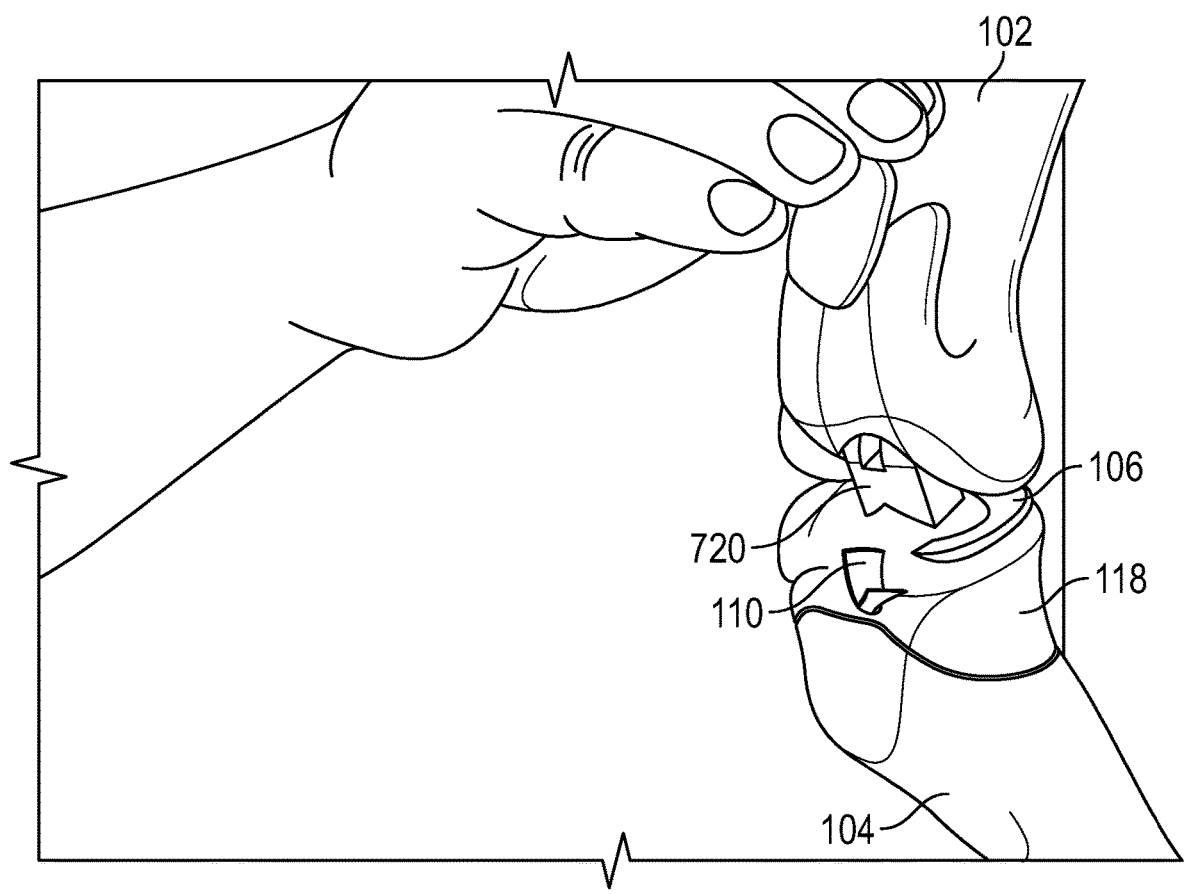
FIG. 19 shows an example of an injured, partial flexion, force applied showing movement, model according to embodiments described by this disclosure.

FIG. 19 shows an example of an injured, partial flexion, force applied showing movement, model according to embodiments described by this disclosure. As shown, there is movement of the femur 102 and the joinder element 720 is exposed. The other elements shown in FIG. 19, have been described herein. As stated above, the role of force, weight or pressure or any combination of the three is considered so that the patient is able to stand, walk or run without undesired displacement of the bones, such as femur, tibia, meniscus, etc.

FIG. 20 shows an example of an injured, partial flexion, no-force applied showing movement, model according to embodiments described by this disclosure. The other elements shown in FIG. 20, have been described herein. As shown in FIG. 20, an alteration, i.e., marking 2034, is made to the femur 102 to illustrate how the femur 102 will be repaired during surgery. A desired alteration, i.e., marking 2032, may be indicated on the tibia 104 as well.

This provides a surgeon with a priori knowledge of what to expect during the surgery and the degree and scope of the surgical procedure. The entire surgical procedure can be replicated prior to the actual surgery using the model. Markings 2032, 2034, which may be hand-made and/or computer generated modifications of the femur 102, tibia 104, displaceable osteotomy element 118 and ligament 110 may also be generated to be used as a template during the actual surgical procedure. The markings 2032, 2034 may be etched, drawn, or sketched onto the various components to illustrate what is the desired process during the procedure.

The markings 2032, 2034 are used to illustrate any deformities, abnormalities or undesired characteristics of the bones, ligaments, etc. The surgeon can use these markings 2032, 2034 to guide any corrective surgical procedures during the operation. For example, the markings 2032, 2034 can illustrate whether the surgeon needs to re-shape a portion of the femur, tibia, ligament osteotomy element or other part of the leg. This may include grinding, planning or removing portions of bone, ligament, etc. as well as applying an epoxy, bonding agent, additional plates to structurally repair a portion of the femur, tibia, ligament etc.

Figure 21:
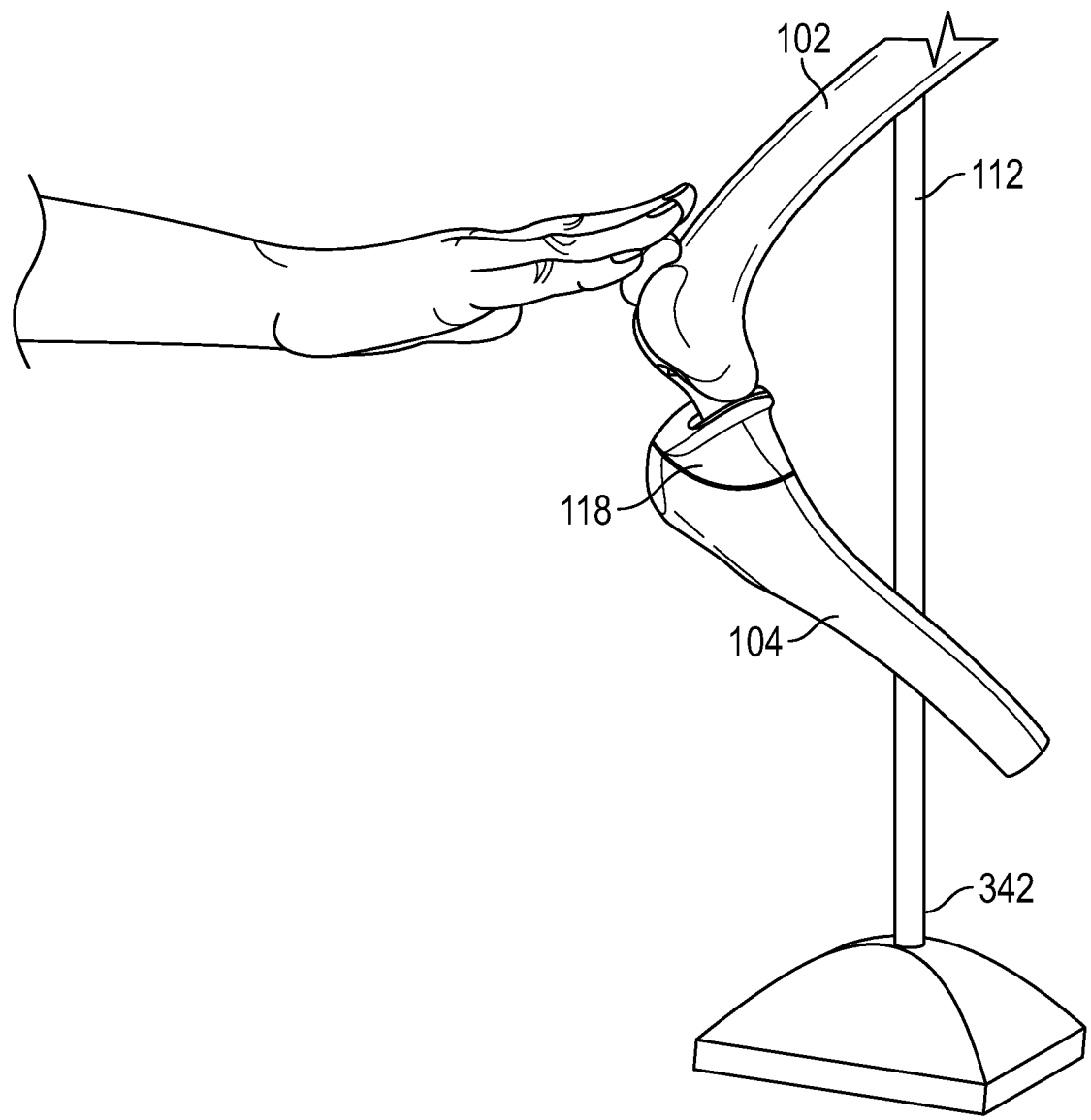
FIG. 21 shows an example of an injured, partial flexion, force applied showing movement, model according to embodiments described by this disclosure.

FIG. 21 shows an example of an injured, partial flexion, force applied showing movement, model according to embodiments described by this disclosure.

Figure 22:
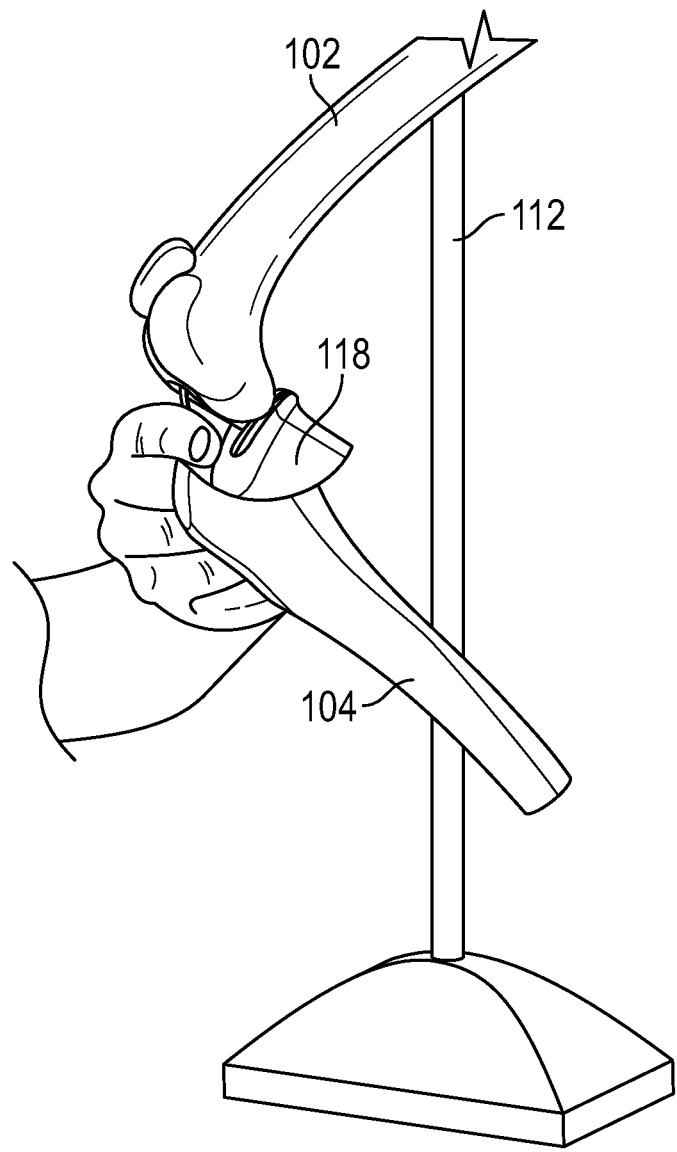
FIG. 22 shows an example of operation in progress, partial flexion according to embodiments of this disclosure.

FIG. 22 shows an example of operation in progress, partial flexion according to embodiments of this disclosure.

Figure 23:
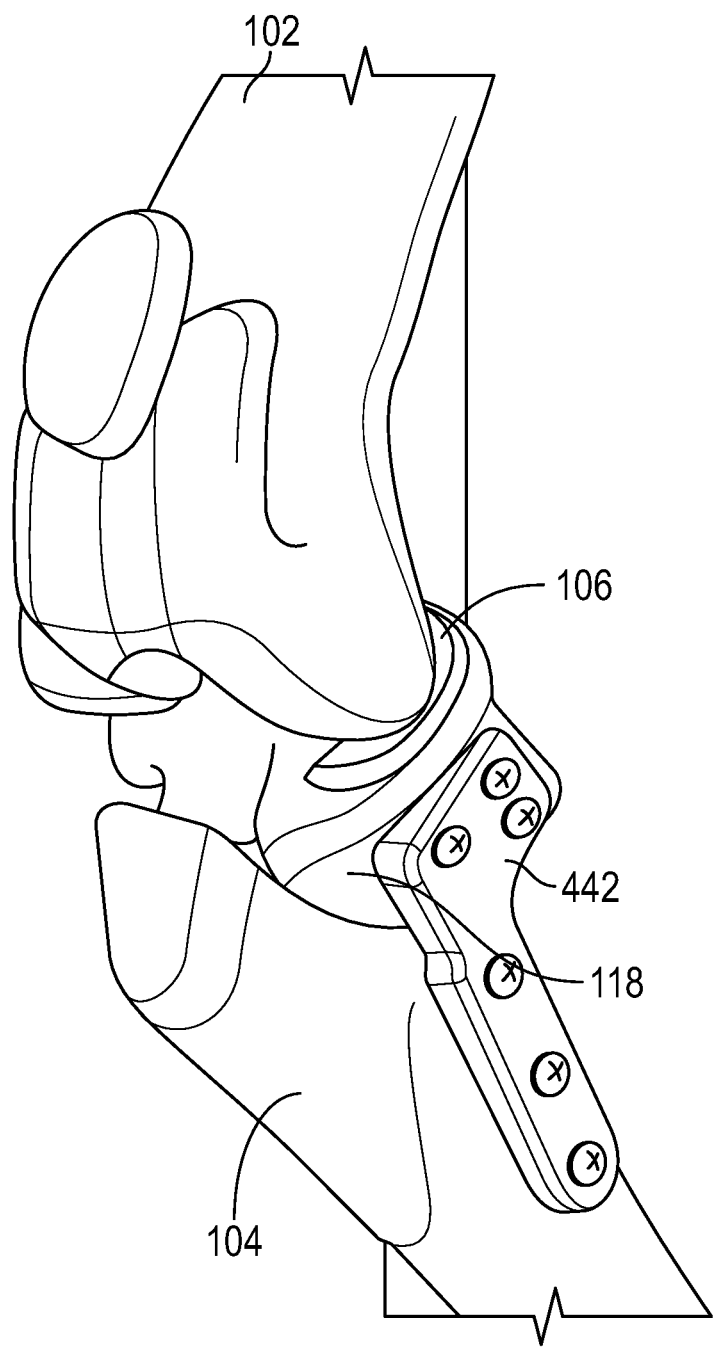
FIG. 23 shows an example of post-operative, partial flexion according to embodiments of this disclosure.

FIG. 23 shows an example of post-operative, partial flexion according to embodiments of this disclosure.

Figure 24:
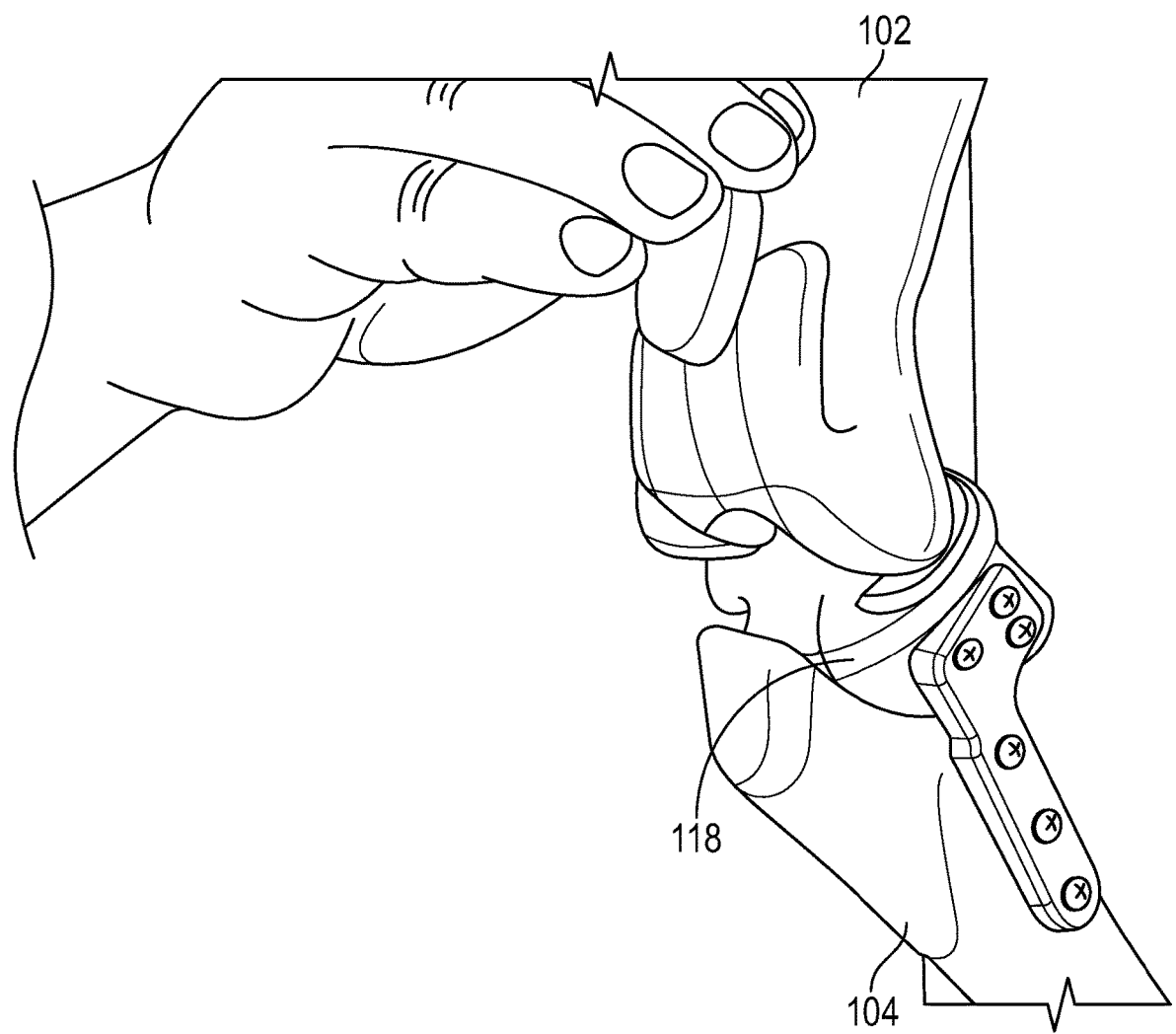
FIG. 24 shows an example of post-operative, partial flexion, force applied showing no movement according to embodiments of this disclosure.

FIG. 24 shows an example of post-operative, partial flexion, force applied showing no movement according to embodiments of this disclosure.

Embodiments of the TPLO demonstration model may include a mounting base for the support on which the name of the surgical procedure may be depicted, as well as the name of the customer (practice, vendor, etc.). The base may include two storage compartments, one for storing of the scissors, knife, etc., used to cut the ligament element during the demonstration, and one for storing the bone plate. Magnets may be included in the storage compartments to secure the bone plate and scissors.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

Although the following detailed description contains many specifics for the purposes of illustration, anyone of ordinary skill in the art will appreciate that many variations and alterations to the following details are within the scope of the disclosure. Accordingly, the following embodiments are set forth without any loss of generality to, and without imposing limitations upon, the claims.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down,"

"above," "below," and the like, are words of convenience and are not to be construed as limiting terms. Also, the terms apparatus and device may be used interchangeably in this text.

In this detailed description, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present disclosure.

Furthermore, in this detailed description, a person skilled in the art should note that quantitative qualifying terms such as "generally," "substantially," "mostly," "approximately" and other terms are used, in general, to mean that the referred to object, characteristic, or quality constitutes a majority of the subject of the reference. The meaning of any of these terms is dependent upon the context within which it is used, and the meaning may be expressly modified.

Some of the illustrative embodiments of the present disclosure may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the disclosure has been described with reference to exemplary embodiments, it will be understood by those skilled in the art that various changes may be made and equivalents may be substituted for elements thereof without departing from the scope. In addition, many modifications may be made to adapt a particular situation or material to the teachings without departing from the essential scope thereof.

Therefore, it is intended that the disclosure not be limited to the particular embodiment disclosed as the best or only mode contemplated for carrying out this disclosure, but that the disclosure will include all embodiments falling within the scope of the appended claims. Also, in the drawings and the description, there have been disclosed exemplary embodiments and, although specific terms may have been employed, they are unless otherwise stated used in a generic and descriptive sense only and not for purposes of limitation, the scope of the disclosure therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the disclosure should be determined by the appended claims and their legal equivalents, and not by the examples given.

What is claimed is:

1. A three-dimensional model for demonstrating a tibial plateau leveling osteotomy surgical procedure, comprising:
   a femur;
   a tibia including a displaceable osteotomy element having at least one embedded magnet, and a body having at least one embedded magnet;
   a bone plate magnetically couplable to the displaceable osteotomy element and the body of the tibia;
   a replaceable cranial cruciate ligament coupled to the femur and the displaceable osteotomy element; and
   a support including a shaft, a fixed element rotationally coupled to the femur, and a movable element, displaceable along the shaft, rotationally coupled to the body of the tibia.

2. The three-dimensional model of claim 1, where the bone plate includes at least one embedded magnet.

3. The three-dimensional model of claim 2, where the displaceable osteotomy element has a first position associated with a pre-operative state and a second position associated with a post-operative state.

4. The three-dimensional model of claim 3, where the femur has a pre-operative configuration that represents an injured state and a post-operative configuration that represents a healed state.

5. The three-dimensional model of claim 4, where the tibia has a pre-operative configuration that represents an injury state and a post-operative configuration that represents a healed state.

6. The three-dimensional model of claim 1, where the replaceable cranial cruciate ligament includes two ends that are coupled to the displaceable osteotomy element using a cleat.

7. The three-dimensional model of claim 6, where the cleat is a self-locking cleat.

8. The three-dimensional model of claim 1, where the support shaft has a vertical orientation.

9. The three-dimensional model of claim 8, where the displaceable osteotomy element is disposed on an upper portion of the body of the tibia.

10. The three-dimensional model of claim 9, where the embedded magnets provide proper alignment of the femur and the tibia.

11. A three-dimensional model for demonstrating an osteotomy surgical procedure, comprising:
    a first bone;
    a second bone including a displaceable osteotomy element having at least one embedded magnet, and a body having at least one embedded magnet;
    a bone plate magnetically couplable to the displaceable osteotomy element and the body of the second bone; and
    a support including a shaft, a first element coupled to the first bone, and a second element coupled to the second bone.

12. The three-dimensional model of claim 11, where the bone plate includes at least one embedded magnet.

13. The three-dimensional model of claim 12, where the displaceable osteotomy element has a first position associated with a pre-operative state and a second position associated with a post-operative state.

14. The three-dimensional model of claim 13, where the first bone has a pre-operative configuration that represents an injured state and a post-operative configuration that represents a healed state.

15. The three-dimensional model of claim 14, where the second bone has a pre-operative configuration that represents an injury state and a post-operative configuration that represents a healed state.

16. The three-dimensional model of claim 11, further comprising a replaceable ligament coupled to the first bone and the displaceable osteotomy element, where the replaceable ligament includes two ends that are coupled to the displaceable osteotomy element using a cleat.

17. The three-dimensional model of claim 16, where the cleat is a self-locking cleat.

18. The three-dimensional model of claim 11, where the support shaft has a vertical orientation.

19. The three-dimensional model of claim 18, where the displaceable osteotomy element is disposed on an upper portion of the body of the second bone.

20. The three-dimensional model of claim 19, where the embedded magnets provide proper alignment of the first and second bones.

\* \* \* \* \*